United States Patent
Richards et al.

(10) Patent No.: US 10,571,338 B2
(45) Date of Patent: Feb. 25, 2020

(54) ENHANCED COLOR PALETTE SYSTEMS AND METHODS FOR INFRARED IMAGING

(71) Applicant: FLIR Systems, Inc., Wilsonville, OR (US)

(72) Inventors: Austin A. Richards, Santa Barbara, CA (US); Charles W. Handley, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/799,786

(22) Filed: Oct. 31, 2017

(65) Prior Publication Data

US 2018/0052057 A1    Feb. 22, 2018

Related U.S. Application Data

(63) Continuation of application No. PCT/US2016/030308, filed on Apr. 29, 2016.
(Continued)

(51) Int. Cl.
*G01J 5/02* (2006.01)
*H04N 5/33* (2006.01)
(Continued)

(52) U.S. Cl.
CPC .............. *G01J 5/025* (2013.01); *G01J 3/526* (2013.01); *H04N 5/33* (2013.01); *H04N 9/64* (2013.01);
(Continued)

(58) Field of Classification Search
CPC .............................. G06T 11/001; H04N 9/64
See application file for complete search history.

(56) References Cited

U.S. PATENT DOCUMENTS

| | | | | |
|---|---|---|---|---|
| 6,542,140 B1 * | 4/2003 | Ishigami | .............. | G09G 3/3607 345/501 |
| 6,968,092 B1 * | 11/2005 | Winger | ................... | G06T 9/008 375/240.22 |

(Continued)

FOREIGN PATENT DOCUMENTS

CN   102611897   7/2012

OTHER PUBLICATIONS

Rogowitz et al., "How Not to Lie with Visualization", Computers in Physics, 1996, 6 pages, vol. 10, No. 3, American Institute of Physics.

*Primary Examiner* — Phi Hoang
(74) *Attorney, Agent, or Firm* — Haynes and Boone, LLP

(57) ABSTRACT

Imaging systems and methods are disclosed for generating enhanced visual representations of captured data such as infrared image data. For example, the perceived color distance or contrast between colors representing adjacent output levels (e.g., temperature or infrared intensity levels) are enhanced in visual representations of infrared images. According to embodiments, infrared image data values representing a scene may be mapped according to a color palette implemented using complementary colors as adjacent (e.g., successive) base colors or a sequence of colors, that repeats a predetermine set of hues with varying saturation and/or intensity, thereby increasing the color contrast between pixels representing subtle temperature differences in the scene. The color palette can be enlarged by mapping a larger number of distinct output levels to a larger sequence of colors, for example by increasing the bit-depth of the color palette, such that color transitions look smoother and more natural.

20 Claims, 17 Drawing Sheets

Related U.S. Application Data

(60) Provisional application No. 62/156,166, filed on May 1, 2015, provisional application No. 62/156,163, filed on May 1, 2015.

(51) Int. Cl.
  *G01J 3/52* (2006.01)
  *H04N 9/64* (2006.01)
  *G01J 5/00* (2006.01)

(52) U.S. Cl.
  CPC ................. *G01J 3/52* (2013.01); *G01J 3/528* (2013.01); *G01J 2005/0077* (2013.01)

(56) References Cited

U.S. PATENT DOCUMENTS

| | | | | |
|---|---|---|---|---|
| 2006/0132722 A1* | 6/2006 | Colpaert | ............... | G02B 26/008 353/84 |
| 2007/0024636 A1* | 2/2007 | Lo | ................ | G09G 3/2003 345/596 |
| 2008/0187215 A1* | 8/2008 | Gordon | ................ | H04N 1/6058 382/162 |
| 2010/0095235 A1* | 4/2010 | Bennett | ................. | G06Q 99/00 715/781 |
| 2011/0091102 A1* | 4/2011 | Cimbalista, Jr. | ....... | H04N 1/465 382/167 |
| 2013/0048855 A1* | 2/2013 | Abreo | ...................... | H04N 5/33 250/330 |
| 2013/0242122 A1* | 9/2013 | Toyoda | ................ | H04N 5/2327 348/208.6 |
| 2014/0267361 A1 | 9/2014 | McClanahan | | |

* cited by examiner

| Base Color Number | Output Level | Color to Prior Base Color Delta | Red Value | Green Value | Blue Value | Color Name |
|---|---|---|---|---|---|---|
| 1 | 1 | N/A | 0 | 0 | 255 | Blue |
| | 2 | | 5 | 5 | 250 | |
| | 3 | | 10 | 10 | 245 | |
| | 4 | | 15 | 15 | 240 | |
| | 5 | | 20 | 20 | 235 | |
| | 6 | | 25 | 25 | 230 | |
| | 7 | | 30 | 30 | 225 | |
| | 8 | | 35 | 35 | 220 | |
| | 9 | | 40 | 40 | 215 | |
| | 10 | | 45 | 45 | 210 | |
| | 11 | | 50 | 50 | 205 | |
| | 12 | | 55 | 55 | 200 | |
| | 13 | | 60 | 60 | 195 | |
| | 14 | | 65 | 65 | 190 | |
| | 15 | | 70 | 70 | 185 | |
| | 16 | | 75 | 75 | 180 | |
| | 17 | | 80 | 80 | 175 | |
| | 18 | | 85 | 85 | 170 | |
| | 19 | | 90 | 90 | 165 | |
| | 20 | | 95 | 95 | 160 | |
| | 21 | | 100 | 100 | 155 | |
| 2 | 51 | 51.2 | 255 | 255 | 0 | Yellow |
| 3 | 103 | 51.2 | 255 | 0 | 255 | Magenta |
| 4 | 154 | 51.2 | 0 | 255 | 0 | Green |
| 5 | 205 | 51.2 | 255 | 0 | 0 | Red |
| 6 | 256 | 51.2 | 0 | 255 | 255 | Cyan |

FIG. 4

| Base Color Number | Output Level | Color to Prior Base Color Delta | Red Value | Green Value | Blue Value | Colour Name |
|---|---|---|---|---|---|---|
| 1 | 1 | N/A | 0 | 0 | 255 | Blue |
| 2 | 11 | 10 | 255 | 255 | 0 | Yellow |
| 3 | 21 | 10 | 127 | 0 | 255 | Violet |
| 4 | 32 | 11 | 127 | 255 | 0 | Chartreuse |
| 5 | 42 | 10 | 255 | 0 | 255 | Magenta |
| 6 | 52 | 10 | 0 | 255 | 0 | Green |
| 7 | 62 | 10 | 255 | 0 | 127 | Rose |
| 8 | 73 | 11 | 0 | 255 | 127 | Spring Green |
| 9 | 83 | 10 | 255 | 0 | 0 | Red |
| 10 | 93 | 10 | 0 | 255 | 255 | Cyan |
| 11 | 103 | 10 | 255 | 127 | 0 | Orange |
| 12 | 114 | 11 | 0 | 127 | 255 | Azure |
| 13 | 124 | 10 | 255 | 255 | 0 | Yellow |
| 14 | 134 | 10 | 0 | 0 | 255 | Blue |
| 15 | 144 | 10 | 127 | 255 | 0 | Chartreuse |
| 16 | 155 | 11 | 127 | 0 | 255 | Violet |
| 17 | 165 | 10 | 0 | 255 | 0 | Green |
| 18 | 175 | 10 | 255 | 0 | 255 | Magenta |
| 19 | 185 | 10 | 0 | 255 | 127 | Spring Green |
| 20 | 196 | 11 | 255 | 0 | 127 | Rose |
| 21 | 206 | 10 | 0 | 255 | 255 | Cyan |
| 22 | 216 | 10 | 255 | 0 | 0 | Red |
| 23 | 226 | 10 | 0 | 127 | 255 | Azure |
| 24 | 237 | 11 | 255 | 127 | 0 | Orange |
| 25 | 247 | 10 | 0 | 0 | 255 | Blue |
| 26 | 256 | 9 | 255 | 255 | 0 | Yellow |

FIG. 14

ENHANCED COLOR PALETTE SYSTEMS AND METHODS FOR INFRARED IMAGING

CROSS-REFERENCE TO RELATED APPLICATIONS

This application is a continuation of International Patent Application No. PCT/US2016/030308 filed Apr. 29, 2016 and entitled "ENHANCED COLOR PALETTE SYSTEMS AND METHODS FOR INFRARED IMAGING," which is incorporated herein by reference in its entirety.

International Patent Application No. PCT/US2016/030308 filed Apr. 29, 2016 claims priority to and the benefit of U.S. Provisional Patent Application No. 62/156,163, filed May 1, 2015 and entitled "ENHANCED COLOR PALETTE SYSTEMS AND METHODS FOR INFRARED IMAGING," which is hereby incorporated by reference in its entirety.

International Patent Application No. PCT/US 2016/030308 filed Apr. 29, 2016 claims priority to and the benefit of U.S. Provisional Patent Application No. 62/156,166, filed May 1, 2015 and entitled "ENHANCED COLOR PALETTE SYSTEMS AND METHODS FOR INFRARED IMAGING," which is hereby incorporated by reference in its entirety.

TECHNICAL FIELD

The present application generally relates to systems and methods for displaying captured infrared data values representing a captured scene on a display, and, more specifically, for providing enhanced display and interpretation of the infrared data values in false colors or pseudo-colors.

BACKGROUND

Thermal infrared images of a scene are often useful for monitoring, inspection, and maintenance purposes. Often a thermal imaging device is provided to capture infrared information or data values indicative of the intensity of infrared energy received from the scene, and create or generate a visual representation of the captured infrared information. For example, infrared information may be presented in the form of an infrared image, which represents infrared radiation emitted from an observed real world scene.

Infrared radiation is not visible to the human eye; there are no natural relations between the captured infrared image data values of each pixel in an infrared image and colors of a visual representation of the infrared image generated on a display. Therefore, information visualization processes, often referred to as false coloring or pseudo-coloring, are typically used to map captured infrared image data value of each pixel in an infrared image to a corresponding color or grayscale displayed on a display according to a palette or look-up table (LUT).

Color used to depict thermal images is useful because it stimulates a perceived contrast response in the brain that exceeds the perceived contrast between gray levels. Traditional color palettes or LUTs are designed around colors of the rainbow, the colors of incandescent objects at different temperatures, or other aesthetically appealing color arrangements, and typically map infrared image data values to a limited number of output color levels (e.g., 8-bit, or 256, color levels).

The perceived color contrast in the aforementioned examples is low between adjacent 8-bit output color levels resulting in difficulty distinguishing consecutive temperatures of the captured image. As a result, there is a need for improved techniques for visualization of local areas of interest in a displayed infrared image, particularly in regards to infrared imaging color palettes.

SUMMARY

Various techniques are disclosed herein for systems and methods, in accordance with one or more embodiments, using at least one infrared (IR) imaging device (e.g., thermal IR imaging device) to provide an enhanced visual representation of captured IR (e.g., thermal) image data of a scene via improved color palettes. For example, in some embodiments, color palettes utilizing complementary colors (and near-complementary colors in some embodiments) in a color space (e.g., an RGB color space) as adjacent (e.g., successive) base colors or breakpoints may be used to depict temperature value transitions in an infrared image representing a real world scene. Such palettes are designed using a scientific approach based on color theory and mathematical representations to maximize perceived contrast, not strictly visual appeal.

According to the different embodiments described herein, the generating and displaying of enhanced visual representations of IR images may be provided, in particular, with regard to complementary colors or other color arrangements that increase the perceptual color distance (e.g., the perceived color contrast) between pixels representing IR intensity levels (e.g., temperatures) that are different but nearby each other. Therefore, in some embodiments, an easily interpretable visualization of an IR image that may be chosen by the user is provided.

In some embodiments of the present disclosure, a method and a system are provided for generating an improved visual representation of IR data values captured by an IR imaging sensor, via advantageous arrangements of complementary colors in a palette or LUT that improve the perceived color distance or contrast between nearby IR data values. For example, the method may include: receiving IR image data captured by an IR imaging sensor comprising a plurality of detector elements, wherein the IR image data comprises, for each detector element, a corresponding pixel having an IR data value representing an intensity of IR radiation received by the detector element; and generating a visual representation of at least a portion of the IR image data, wherein the visual representation comprises, for each pixel of the at least a portion of the IR image data, a corresponding color-representing component according to a color model, and wherein the generating the visual representation comprises, for each pixel: determining an output level based on the IR data value of the pixel, determining a color value that corresponds to the determined output level according to a palette, wherein the palette comprises a sequence of color values corresponding to a range of discrete output levels, the sequence of color values comprising a series of base color values positioned at substantially similar intervals partitioning the sequence, wherein color values in the sequence other than the base color values are interpolated between successive base color values, and wherein the series of base color values comprises at least one pair of successive base color values representing a pair of colors that are complementary to each other, and assigning the determined color value to the corresponding color-representing component of the visual representation.

In another example, the system may include: an IR imaging sensor comprising a plurality of detector elements, the IR imaging sensor being configured to capture IR image data comprising, for each detector element, a corresponding pixel having an IR data value that represents an intensity of IR radiation received by the detector element; a memory configured to store a palette comprising a sequence of color values corresponding to a range of discrete output levels, wherein the sequence of color values comprises a series of base color values positioned at substantially similar intervals partitioning the sequence, wherein color values in the sequence other than the base color values are interpolated between successive base color values, and wherein the series of base color values comprises at least one pair of successive base color values representing a pair of colors that are complementary to each other; and a processor communicatively coupled to the IR imaging sensor and the memory, the processor being configured to generate a visual representation of at least a portion of the IR image data, wherein the visual representation comprises, for each pixel of the at least a portion of the IR image data, a corresponding color-representing component according to a color model, and wherein the processor is configured to generate the visual representation by: determining, for each pixel of at least a portion of the IR image data, an output level based on the IR data value of the pixel, determining a color value that corresponds to the determined output level according to the palette, and assigning the determined color value to the corresponding color-representing component of the visual representation.

In other embodiments of the present disclosure, a method and a system are provided for generating an improved visual representation of IR data values captured by an IR imaging sensor, via a palette or LUT arranged to utilize a large number of colors to improve the perceived color distance or contrast between nearby IR data values. For example, the method may include: receiving IR image data captured by an IR imaging sensor comprising a plurality of detector elements, wherein the IR image data comprises, for each detector element, a corresponding pixel having an IR data value representing an intensity of IR radiation received by the detector element; and generating a visual representation of at least a portion of the IR image data, wherein the visual representation comprises, for each pixel of the at least a portion of the IR image data, a corresponding color-representing component according to a color model, and wherein the generating the visual representation comprises, for each pixel: determining an output level based on the IR data value of the pixel, determining a color value that corresponds to the determined output level according to a palette, wherein the palette comprises a sequence of color values corresponding to a range of discrete output levels, the sequence of color values comprising a series of base color values positioned at substantially similar intervals partitioning the sequence, wherein color values in the sequence other than the base color values are interpolated between successive base color values, and wherein the series of base color values comprises two or more subseries each representing a different saturation and/or intensity of a same set of predetermined hues, and assigning the determined color value to the corresponding color-representing component of the visual representation.

In another example, the system may include: an IR imaging sensor comprising a plurality of detector elements, the IR imaging sensor being configured to capture IR image data comprising, for each detector element, a corresponding pixel having an IR data value that represents an intensity of IR radiation received by the detector element; a memory configured to store a palette comprising a sequence of color values corresponding to a range of discrete output levels, wherein the sequence of color values comprises a series of base color values positioned at substantially similar intervals partitioning the predetermined sequence, wherein color values in the sequence other than the base color values are interpolated between successive base color values, and wherein the series of base color values comprises two or more subseries each representing a different saturation and/ or intensity of a same set of predetermined hues; and a processor communicatively coupled to the IR imaging sensor and the memory, the processor being configured to generate a visual representation of at least a portion of the IR image data, wherein the visual representation comprises, for each pixel of the at least a portion of the IR image data, a corresponding color-representing component according to a color model, and wherein the processor is configured to generate the visual representation by: determining, for each pixel of at least a portion of the IR image data, an output level based on the IR data value of the pixel, determining a color value that corresponds to the determined output level according to the palette, and assigning the determined color value to the corresponding color-representing component of the visual representation. In other example systems and methods, the sequence of color values in the palette of the method may comprise at least 512 color values corresponding to at least 512 discrete output levels.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 illustrates a palette in accordance with an embodiment of the present disclosure.

FIG. 14 illustrates a palette in accordance with an embodiment of the present disclosure.

Embodiments of the invention and their advantages are best understood by referring to the detailed description that follows. It should be appreciated that like reference numerals are used to identify like elements illustrated in one or more of the figures.

DETAILED DESCRIPTION

Systems and methods are disclosed herein to provide, according to various embodiments, enhanced visual representations and displays of infrared data values. For example, an infrared camera may be used to capture thermal images. The thermal images may be processed by performing a mapping process using improved palettes (or LUTs) according to various embodiments of the disclosure to create and display visual representations advantageously having better distinguishable temperature range variations.

Hereinafter, the terms "visual representation of infrared data values," "visual representation," and "infrared image" are used interchangeably.

Method embodiments herein are typically described for a single frame of infrared data values for easy understanding; however, the methods are applicable to any number of captured frames of infrared data values and may be used in any thermal imaging device generating still images and/or video image sequences.

Figure 1:
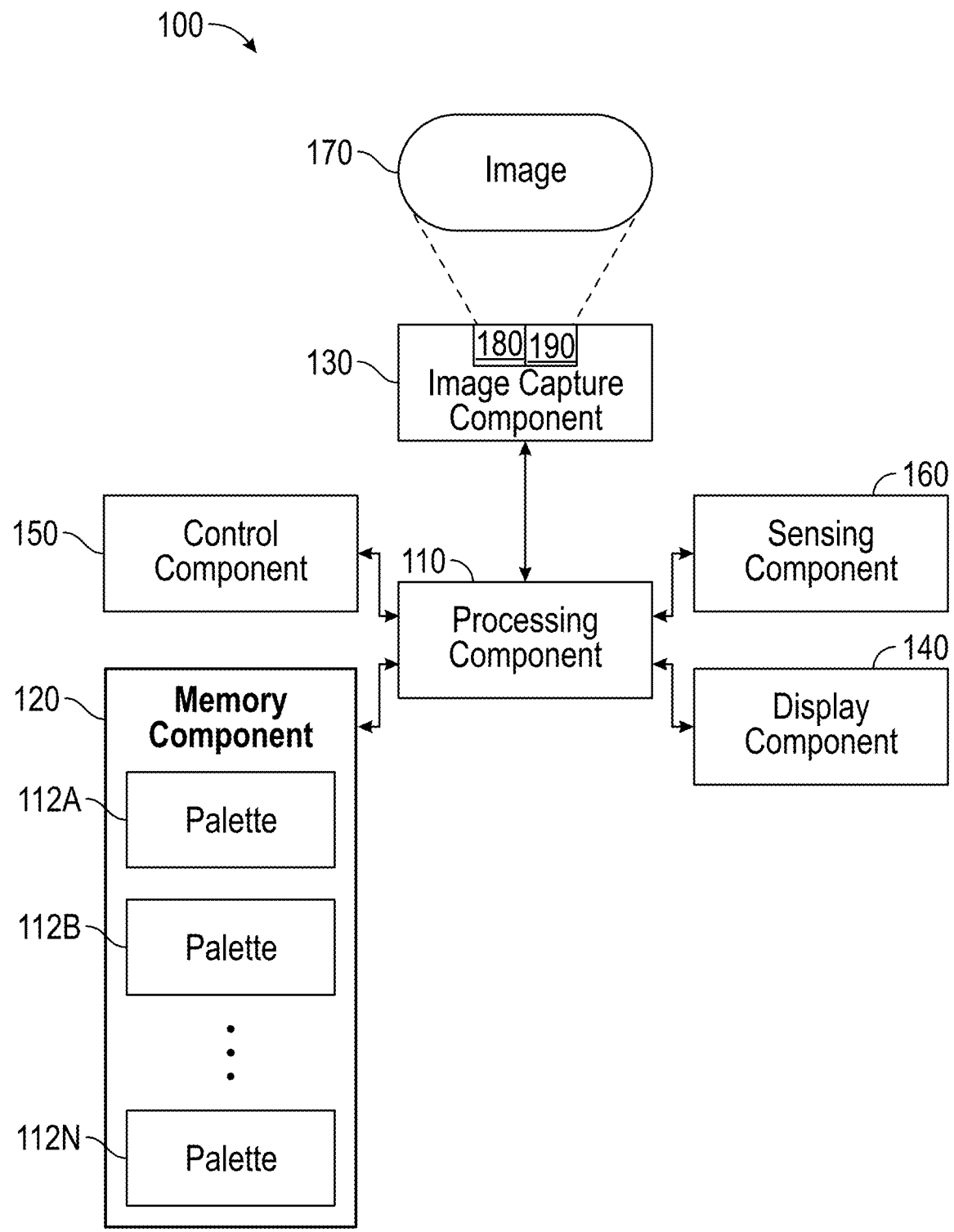
FIG. 1 illustrates a block diagram of an imaging system in accordance with one or more embodiments of the present disclosure.

FIG. 1 shows a block diagram of one or more embodiments of infrared imaging system 100, e.g., an infrared camera, a tablet computer, a laptop, PDA, mobile device, desktop computer, or any other electronic device capable of being used in thermography for capturing thermal images and/or processing thermal data. System 100 may represent any type of infrared camera that employs infrared detectors.

Infrared imaging system 100 comprises, in one implementation, an image capture component 130 (with infrared sensors and possible inclusion of non-thermal imaging sensors such as near-infrared (NIR)/visible light (VL) imaging sensors), processing component 110, control component 150, memory component 120, display component 140. Optionally, system 100 may include a sensing component 160 such as a motion sensor, light sensor, rangefinder, proximity sensor, moisture sensor, temperature sensor, or other sensing component as desired for particular applications of system 100. System 100 may represent, for example, an infrared imaging device, such as an infrared camera, to capture and process images, such as video images of scene 170. System 100 may comprise an external unit, such as a portable device and/or a remote device that the processing component 110 communicates with unidirectionally or bidirectionally.

In various embodiments of the present disclosure, processing component 110 may comprise any type of a processor or logic device, such as a programmable logic device (PLD) configured to perform processing functions. Processing component 110 may be adapted to interface and communicate with components 130, 150, 120, 140, and/or 160 to perform methods and processing steps and/or operations, such as controlling as well as other conventional system processing functions as would be understood by someone skilled in the art.

In one or more embodiments, processing component 110 may be a processor such as a general or specific purpose processor/processing unit (e.g., a microprocessor), microcontroller or other control logic that comprises sections of code or code portions, stored on a computer readable storage medium (such as memory component 120), that are fixed to perform certain tasks but also other alterable sections of code (stored on a computer readable storage medium) that can be altered during use. Such alterable sections of code can comprise parameters that are to be used as input for the various tasks, such as the calibration of system 100, adaption of the sample rate or the filter for the spatial filtering of the images, or any other parameter related operations known to a person skilled in the art and applied without inventive skill.

In one or more embodiments, processing component 110 is communicatively coupled and communicates with memory 120 where parameters are kept ready for use by the processing component 110 and the images being processed by the processing component 110 can be stored if the user desires. The one or more memory components 120 may comprise a selection of a RAM, disk drive, a floppy disk drive, a magnetic tape drive, an optical disk drive, a CD or DVD drive (R or RW), USB, or other removable or fixed media drive.

In an embodiment of the present disclosure, memory component 120 comprises one or more memory devices adapted to store data and information, including, for example, infrared and/or visible data and information. Memory component 120 may include one or more various types of memory devices including volatile and non-volatile memory devices, including computer-readable medium (portable or fixed). Processing component 110 may be adapted to execute software stored in memory component 120 so as to perform method and process steps and/or operations described herein. According to various embodiments of the disclosure, memory component 120 may be configured to store one or more palettes 112A-112N, which may be arranged as LUTs, functional modules, or other data structure or module implementations for example. The one or more palettes stored in memory component 120 may be any one of the palettes discussed herein in connection with various embodiments.

In one embodiment, one or more image capture components include one or more infrared imaging sensors, e.g., any type of infrared detector having a plurality of detector elements, such as for example a focal plane array (FPA) of microbolometers or other infrared detector elements, for capturing infrared image data, such as still image data and/or video stream data, representative of an image of IR radiation (e.g., temperature) received from a scene or object (e.g., scene 170). In one implementation, the image capture component 130 may comprise an infrared imaging sensor that may provide for representing (e.g., converting) the captured image data as digital data (e.g., via an analog-to-digital converter included as part of the infrared sensor or separate from the infrared sensor as part of the system 100). In one embodiment, image capture component 130 may include a radiometric infrared camera calibrated to map image data captured by the camera to corresponding temperatures of objects in the image data.

In one or more embodiments, image capture component 130 may further represent or include a lens, a shutter, and/or other associated components along with the vacuum package assembly for capturing infrared image data. Image capture component 130 may further include temperature sensors (temperature sensors may also be distributed within system 100) to provide temperature information to processing component 110 as to operating temperature of image capture component 130.

Image capture component 130 may include one or more additional imaging sensors such as visible light image sensor (e.g., charged-coupled device sensor and/or a complementary metal oxide semiconductor sensor), a short-wave (SWIR) infrared sensor, a mid-wave infrared (MWIR) sensor, and/or a low-light visible and/or near infrared (VIS/NIR) sensor such as an image intensifier. For non-thermal sensors, electron multiplying CCD (EMCCD) sensors, scientific CMOS (sCMOS) sensors, intensified charge-coupled device (ICCD) sensors, and CCD-based and CMOS-based sensors, as well as any other suitable non-thermal sensor to detect NIR, SWIR, and other non-thermal light may be included in image capture component 130. Images obtained by imaging component 130 may be combined through known processes by processing component 110.

In one or more embodiments of the present disclosure, system 100 may be configured to have two physically separate devices as part of imaging component 130, such as a first device comprising an infrared imaging device 180 and a second device comprising a visible light imaging device 190. Devices 180 and 190 may communicate with processing component 110 and have an integrated memory component 120 or one physically separate from the two devices. In one aspect, processing component 110 may be adapted to process the infrared image data (e.g., to provide processed image data), store the infrared image data in memory component 120, and/or retrieve stored infrared image data from memory component 120. For example, processing component 110 may be adapted to process infrared image data stored in memory component 120 to provide processed image data and information (e.g., captured and/or processed infrared image data).

Processing component 110 may be adapted to perform a false color or pseudo-color operation on infrared image data and display processed data on display component 140, thus, providing distinguished temperature gradients of captured thermal values.

According to an embodiment, control component 150 may be configured to receive input from a user, thus, enabling a user to provide input to the infrared imaging system 100. According to an embodiment, the control component 150 comprises a selection of one or more control devices for inputting commands and/or control signals, such as an interactive display (e.g., a touch or pressure sensitive display, a joystick, a mouse, a keyboard and/or record/push-buttons).

In another embodiment, system 100 may be handheld and/or portable, as well as communicate bidirectionally with a remote device (e.g., computer, cellular phone, electronic tablet, or any other electronic device).

In one or more embodiments, processing component 110 may communicate with a remote device. The communications interface may comprise a selection of serial wired communication, Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, Wireless-MAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX), infrared communication and ultrasonic communication, etc., but is not limited thereto.

In one or more embodiments, system 100 is configured to capture infrared image data values, which represent infrared radiation emitted, transmitted, and/or reflected from an observed real world scene. Additionally, system 100 may correct or calibrate the captured data values via applying pre-determined infrared temperature calibration data parameters to map and scale the captured data values for display as an infrared or thermal image singly or combined with a visual light image (e.g., overlaid or fused).

In some embodiments, a machine-readable medium stores non-transitory information comprising a plurality of machine-readable instructions. One or more processing components of the system execute such instructions and cause the system to perform a method according to various embodiments of the disclosure. For example, such instructions, when executed by processing component 110, may cause system 100 to perform a method for generating an improved visual representation of IR data values captured by IR imaging device 180, via advantageous color arrangements/mappings in one or more palettes or LUTs 112A-112N stored in memory component 120 to improve the perceived color distance or contrast between nearby IR data values, according to various embodiments of the disclosure. In some embodiments, processing component 110 may be configured (e.g., by hardwired circuitry, software, firmware, or any combination thereof) to perform such a method according to various embodiments of the disclosure.

In one or more embodiments, processing unit 110 may be a field-programmable gate array (FPGA) or other types of programmable logic device (PLD), which may be configured using a hardware description language (HDL) to perform a method according to various embodiments of the disclosure.

The terms "computer program product", "computer-readable medium", and "machine-readable medium" may be used generally to refer to media such as memory component 120 or the storage medium of processing unit 110 or an external storage medium. These and other forms of storage media may be used to provide instructions to processing unit 110 for execution. Such instructions, generally referred to as "computer program code" (which may be grouped in the form of computer programs or other groupings), when executed, enable the infrared imaging system 100 to perform features or functions of embodiments of the current technology. Further, as used herein, "logic" may include hardware, software, firmware, or a combination of thereof.

Before describing other figures of the disclosure, an overview of color models and palettes utilized in providing user-viewable images (e.g., on a display device) is given. A palette typically comprises a finite set of color and/or grayscale representations selected from a color model (e.g., grayscale values in black and white or other monochrome colors, or color values in RGB, CIEXYZ, CIELab, or any other known color model suitable for representing colors and/or grayscales on a display device) for false coloring or pseudo-coloring of images through assigning of the color and/or grayscale representations to pixels according to predefined mapping rules. A predefined palette represents a finite set of color and/or grayscale values of a color model displayable on a display device thereby making image data visible to the human eye.

In some embodiments, methods comprise generating a visual representation of captured infrared data values by mapping color and/or grayscale values to each pixel of a captured frame of infrared data values, thereby assigning each pixel of the frame of infrared data values a representation value from a color model. Pixel value components may represent various values. For example, one type of pixel value component represents colors as a combination of different color channels or chromaticity values (combined through addition and subtraction), as a combination of hue, saturation, and intensity/brightness, or as other representations appropriate for desired color models.

By way of example, an RGB color model is an additive color model and uses the combination of primary colors red, green, and blue to construct all other colors, as would be understood by one skilled in the art. A color-representing component in a visual representation of the captured IR data values may thus be expressed as the combination of intensities of the three primary colors according to an RGB color model, in other words as a 3-tuple (R, G, B) representing intensities in the three primary colors. For example, if assuming the intensities R, G, B can take on 256 discrete values from 0 to 255 (such as when the intensities are represented by 8-bit integers), 16,777,216 possible colors can be produced by an additive combination of the 256 discrete intensity levels of the three primary colors, with the color white being an equal combination of all three base colors at maximum intensity (255,255,255) and the color black being zero intensity for each component (0,0,0). Although 256 discrete primary color intensity levels have been illustrated in the example above, a 3-tuple for the color-representing component may permit a different number of available intensity levels and/or a different expression (e.g., expressed as a fraction of maximum intensity) as would be understood by one skilled in the art.

In other examples, the color-representing component for a visual representation may be expressed as a combination of hue, saturation, and a brightness value according to an HSV (also referred to as HSB) color model, a combination of hue, saturation, and lightness according to an HSL color model, or other appropriate combinations according to a color model known in the art. As also understood by one skilled in the art, a color-representing component expressed in one color model can be converted into another color model using known formulae.

It is to be understood that although embodiments of the present disclosure are illustrated using an RGB color model as examples, one skilled in the art having viewed the disclosure would be able to modify the embodiments according to the principles taught by the embodiments to utilize other color models, such as but not limited to HSL, HSV, CMYK, NTSC, and ROMM, without departing from the scope of this invention.

Figure 2A:
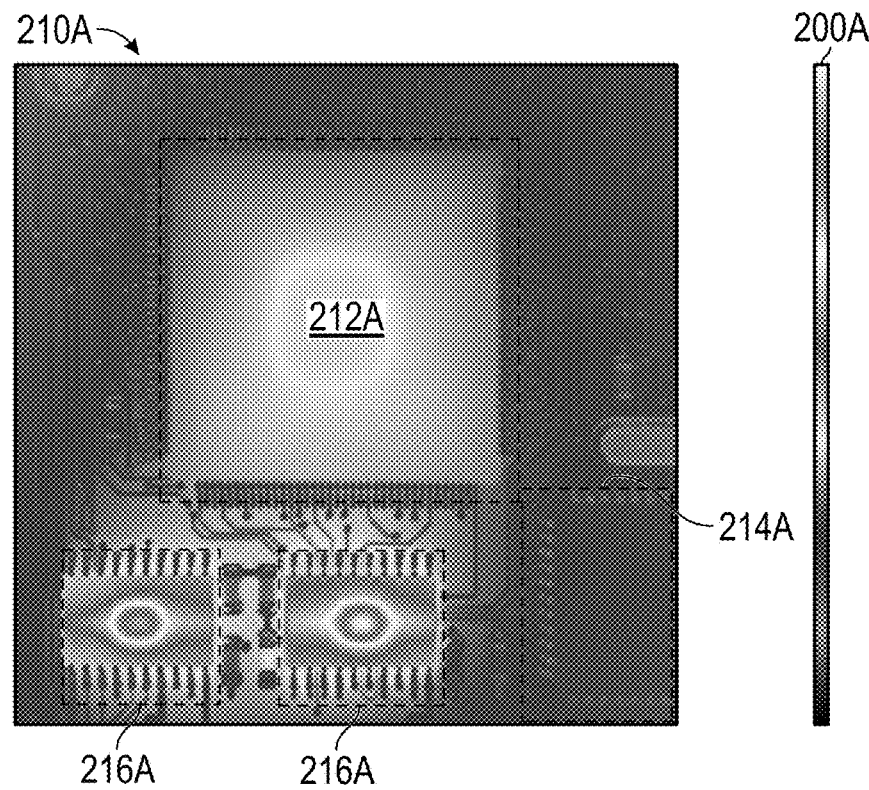
FIGS. 2A-2C illustrate example visual representations of an infrared image generated according to prior art.
Figure 2B:
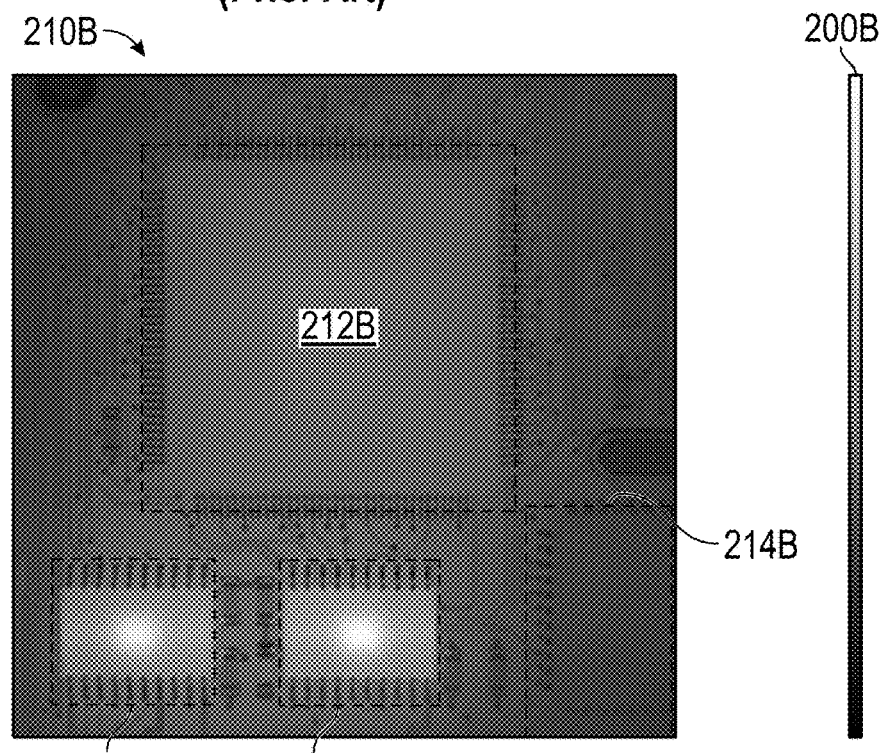
Figure 2C:
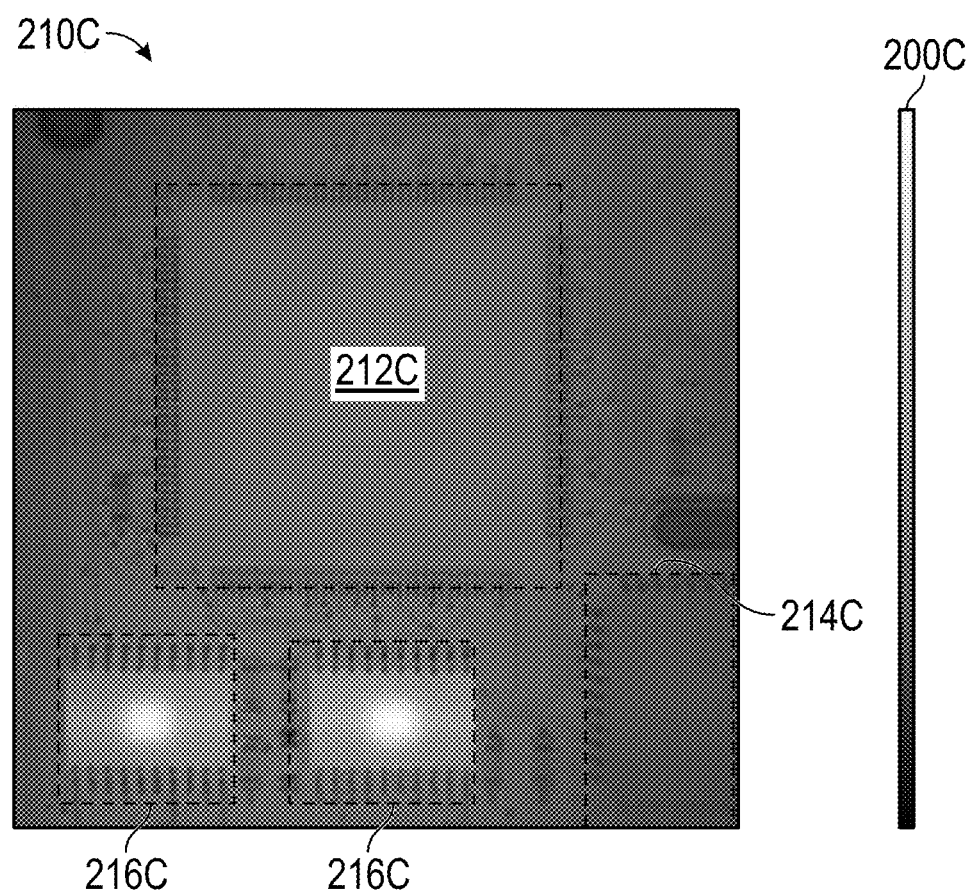

Turning now to FIGS. 2A-2C, example visual representations 210A-210C of a thermal IR image (a thermal image of a circuit board with integrated circuits (ICs) and other components in these examples) are shown in accordance with prior art techniques. In particular, FIGS. 2A-2C respectively show a conventional palette 200A designed around the colors of a rainbow (also referred to herein as a rainbow palette), a conventional grayscale palette 200B (also referred to herein as a white-hot palette), and a conventional palette 200C designed around the colors of incandescent objects (also referred to herein as a fusion or ironbow palette), which are applied to the same 14-bit thermal IR image to produce visual representations 210A-C. Portion 212A (e.g., representing a large IC in a circuit board) and portion 214A (e.g., representing small ICs in the circuit board) of infrared image 210A show low contrast, resulting in difficult determination of temperature value variations.

Corresponding portions 214B-C of visual representations 210B-C appear to be depicted as a singular temperature by the conventional color mappings. Only portions 216A-C located at the bottom of visual representations 210A-C display substantial temperature value transitions and relatively noticeable differentiation between neighboring color values. Color palettes 200A-C, which are illustrated as color bars on the right edge of visual representations 210A-C in these examples, show the various colors corresponding to a range of output levels representing IR intensity or temperature. These colors in color palettes 200A-C may be represented by color values (e.g., 3-tuples) according to an RGB color model having 256 discrete intensity levels for each primary color, for example.

Figure 3A:
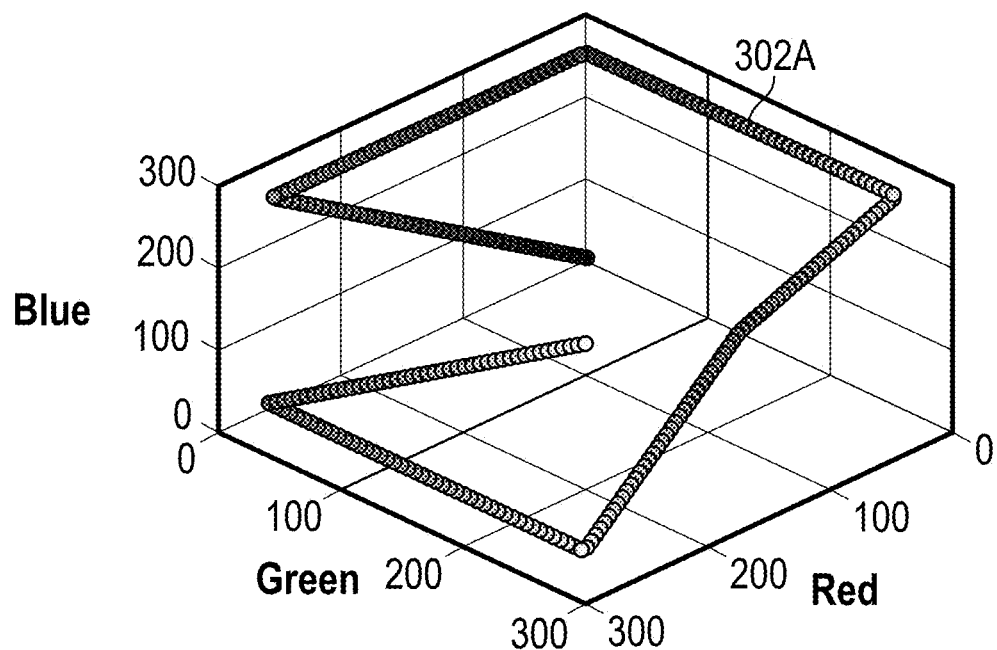
FIGS. 3A-3C illustrate example plots of the color values in the prior art palettes used to generate the prior art visual representation examples of FIGS. 2A-2C.
Figure 3B:
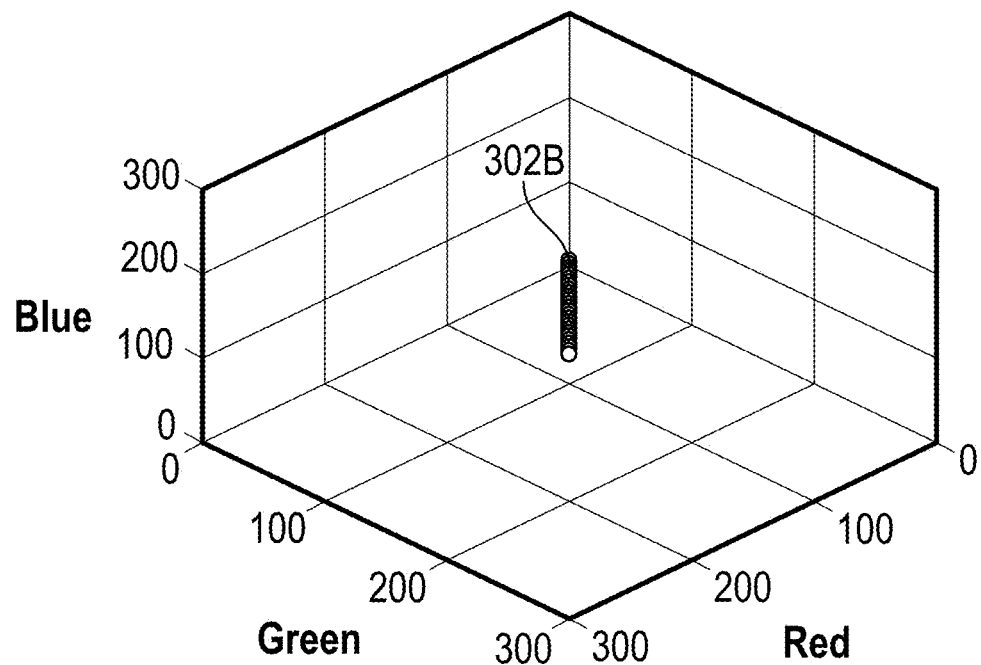
Figure 3C:
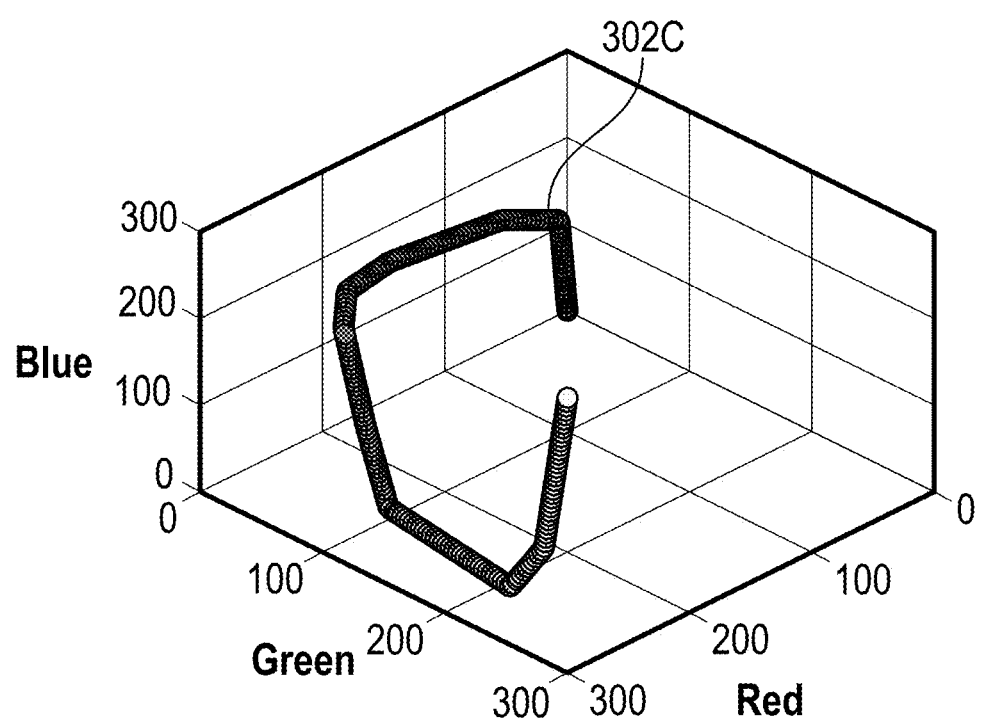

Example plots of the conventional palettes 200A-C used for generating visual representations 210A-C are shown in FIGS. 3A-3C. In FIGS. 3A-3C, the RGB color values in the palettes used in generating visual representations 210A-C are plotted using Cartesian coordinates and 256-point trajectories in RGB space as plots 304A-C, respectively. Plots 302A-C are isometric views into the RGB-space origin at (0,0,0), which is a pure black color value. As plots 302A-C show, the inventor has discovered that there is a significant amount of RGB space not utilized by the rainbow palette, whitehot palette, or ironbow palette. In addition, distances between adjacent individual output levels are substantially small, thus making it difficult to distinguish differences between nearby output levels (i.e., neighboring color values in a palette that represent different temperature values).

For example, conventional palettes such as palettes 200A-C map 256 discrete output levels to corresponding 256 color values. Each of the 256 color values in a palette (e.g., expressed as 3-tuples of 256 discrete primary color intensity levels in RGB) is plotted at a coordinate in the three-dimensional RGB space (the primary colors of the RGB space are red, green, and blue, which are located at the corners of the Euclidean space). Plotting the palettes as a scatter plot in RGB space shows: the extent to which the palette uses the available volume in an RGB space and the closeness of the individual output levels in an RGB space (if the spacing is too close, it is difficult to distinguish variances and differences between nearby output levels).

For example, in rainbow palette 200A, the distance between color values corresponding to adjacent output levels is relatively small in an RGB color space, as plot 302A shows, thus resulting in relatively low perceived contrast. Therefore, the rainbow palette is not a suitable contrast optimizer; it is a familiar color scheme based on the familiar visible light spectrum scheme, Red-Orange-Yellow-Green-Blue-Indigo-Violet. Rainbow palette plot 302A displays relatively saturated hues save the highest and lowest temperatures, which, for example, may rely more on tints and shades, respectively. Grayscale palette plot 302B shown in FIG. 3B is a short, straight line. The short, straight line represents grayscale variations which lie on the diagonal of the color solid to cover 256 discrete output levels. However, the human eye can only distinguish 50-60 variations of gray resulting in approximately 200 indistinguishable greys used in the grayscale palette. Ironbow palette 200C, as corresponding scatter plot 302C in FIG. 3C demonstrates, has similar complications, acting merely as part of an infrared vernacular and using even less space than the rainbow palette. Such shortcomings of the conventional palettes make subtle variations in temperatures across the ICs in the exemplary images 210A-C a laborious read.

Various embodiments of the disclosure discussed herein below may overcome such shortcomings of using conventional palettes to generate visual representations of an IR image. FIG. 4 illustrates a palette 400 in accordance with an embodiment of the disclosure. Palette 400 may comprise or define a sequence of color values 402 corresponding to a range of output levels 404. In this regard, palette 400 is illustrated in FIG. 4 as a LUT indexed by a range of discrete output levels 404 (e.g., an array indexed by output levels 404) for looking up (e.g., accessing or indexing) corresponding color values 402 represented in 3-tuples of an RGB color model. However, as discussed above, palette 400 may be implemented in other data structures or as a functional module (e.g., to calculate or otherwise determine corresponding color values in response to receiving output levels) according to the principles discussed herein, without departing from the scope and spirit of the present disclosure. Note that the column labeled "Color Name" is shown for purposes of illustration, and not necessarily a part of palette 400.

Certain color values in the sequence of color values may be identified as base color values or breakpoints (collectively identified as base color values 406 or individually identified as base color values 406(1) through 406(6) in the example of FIG. 4), according to embodiments. Base color values 406 may be positioned at certain intervals in the sequence of color values 402, for example, at substantially similar intervals partitioning the sequence. In the example palette 400, six base color values 406 are shown at 51-row intervals between successive ones to partition the 256-long sequence of color values, such that base color value 406(1) corresponds to output level 1, base color 406(2) corresponds to output level 52, and so on as shown in FIG. 4. Because the length of the color value sequence may not always be wholly divisible by the number of intervals between base color values, the intervals between them may not always be the same but substantially similar (e.g., +/−2). The color values in palette 400 identified as base color values 406 thus define a series of base color values 406, where successive ones of the base color values in the series are at substantially similar intervals in the sequence of color values 402.

According to various embodiments, the color values of the sequence between two successive base color values (e.g., between base color value 406(1) and 406(2), between 406(2) and 406(3), between 406(3) and 406(4), between 406(4) and 406(5), and between 406(5) and 406(6)) may be interpolated values of the two successive base color values. For example, in some embodiments, the intensity levels for the primary colors R, G, B may individually change by linear interpolation between the RGB intensity levels of two successive base color values. In other embodiments, non-linear interpolation techniques or other interpolation techniques may be used to determine the color values between two successive base color values, for example in connection with color values represented in other color models.

The series of base color values 406 are selected to improve the perceptual color distance between colors corresponding to adjacent output levels, in accordance with various techniques of the disclosure discussed with additional reference to FIGS. 5-16 below. For example, the series of base color values 406 may comprise successive base color values that represent pairs of colors that are complementary to each other, or the series of base color values 406 may comprises two or more subseries that each represent a different saturation and/or intensity of a same set of predetermined hues, as further described herein.

Figure 5:
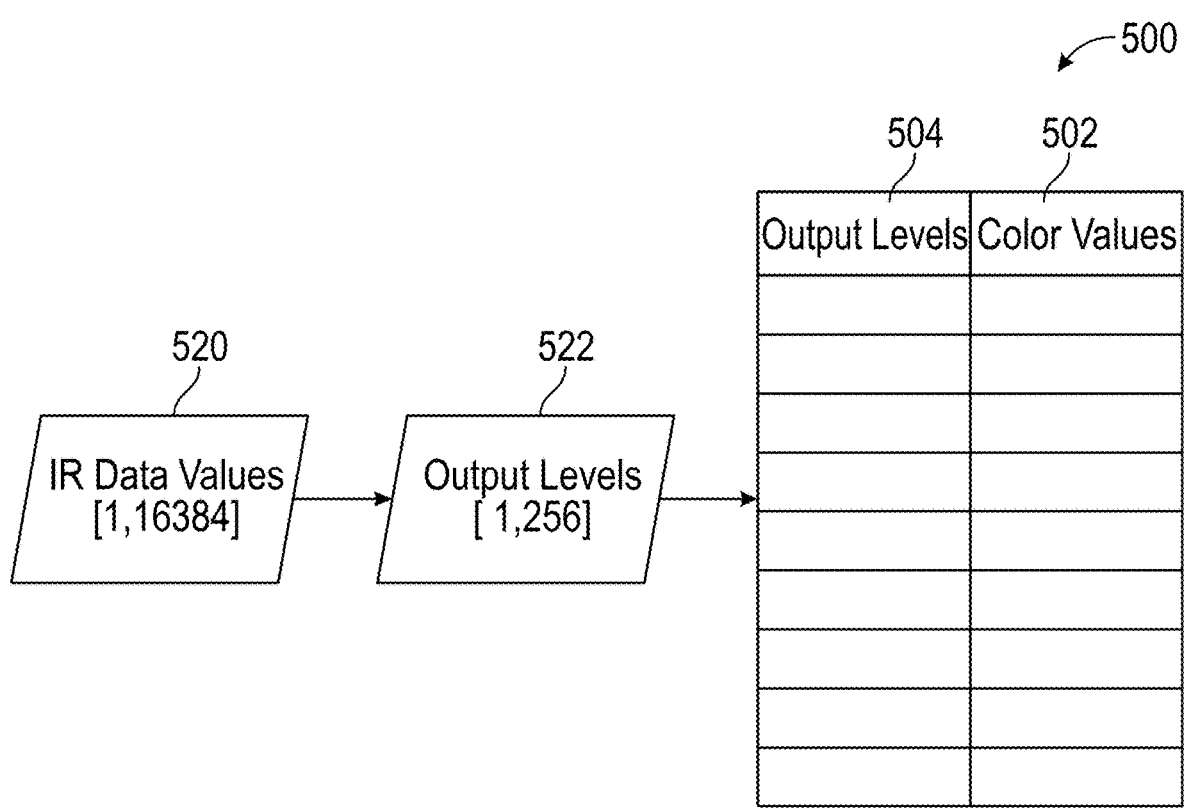
FIG. 5 illustrates how corresponding color values are determined for IR image data values by looking up a palette, in accordance with an embodiment of the present disclosure.

FIG. 5 illustrates how an IR image data value of each pixel in an IR image, such as those captured by image capture component 130 of system 100 for example, is used to determine a corresponding color value according to a palette, in accordance with an embodiment of the disclosure. As discussed above with reference to FIG. 1, an IR image (e.g., IR image data for a frame of IR video or still image) may comprise a plurality of pixels each having an IR data value representing an intensity of IR radiation received by a corresponding detector element of an IR imaging sensor. Such IR data values 520 may be from a range of discrete intensity values (also referred to as counts) available depending on the implementation of image capture component 130. In the example illustrated by FIG. 5, IR data values 520 may take on any one of 16,384 discrete values represented by a 14-bit integer, but in other embodiments IR data values 520 may take on a value from other ranges of counts (e.g., 65,536 discrete values represented by a 16-bit integer).

To determine a corresponding color value for IR data value 520 of a pixel according to a palette 500 (such as palette 400), IR data value 520 may be mapped to an output level 522 from a range of discrete output levels 504 associated with palette 500, in some embodiments. Output level 522 mapped from IR data value 520 can be used to look up a corresponding one of color values 502 in palette 500, as described above with reference to FIG. 4. In the example illustrated by FIG. 5, IR data value 520, which may take on any one of 16,384 discrete values represented by a 14-bit integer, is mapped to output level 522 from a range of 256 discrete output levels to look up, access, or otherwise determine a corresponding color value according to palette 500 that comprises a sequence of 256 color values 502 associated with 256 discrete output levels 504. As may be appreciated, in other embodiments, output level 522 may take on a value from other ranges of output levels associated with a particular implementation of palette 500.

In some embodiments, output level 522 may be determined from IR data value 520 according to a user-defined mapping, such as when a user of system 100 sets via control component 150 a temperature range to be visualized by false color or pseudo-coloring. In some embodiments, output level 522 may be determined from IR data value 520 according to automatic ranging based on the span of all IR data values (e.g., automatically determined mapping relative to the span of all IR data values) captured in a frame of IR image. For example, known histogram analysis techniques such as those described in connection with FIG. 4 of U.S. patent application Ser. No. 14/582,736 filed Dec. 24, 2014 and entitled "Augmented Image Generation" which is hereby incorporated by reference in its entirety, or other appropriate auto ranging techniques may be used for mapping IR data value 520 to output level 522.

In some embodiments, output level 522 may be determined from IR data value 520 according to a fixed mapping between the two. Embodiments in which output level 522 is determined from IR data value 520 by a fixed mapping may provide a radiometric visual representation (e.g., where a specific color represents a specific temperature or IR intensity) of the captured IR image depending on the implementation of the palette, as further discussed herein. System 100 may be configured to allow the user to select (e.g., via control component 150) between the mappings discussed above for various embodiments.

Figure 6A:
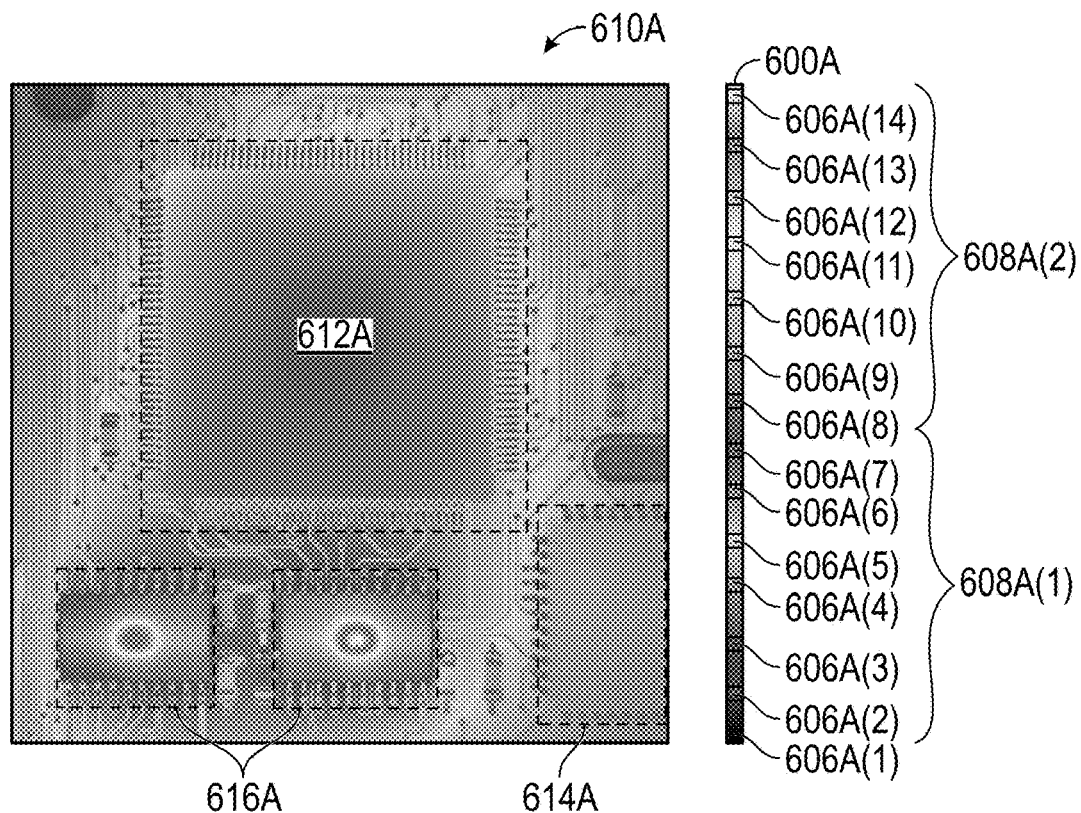
FIGS. 6A-6B illustrate example visual representations of an infrared image generated in accordance with embodiments of the present disclosure.
Figure 6B:
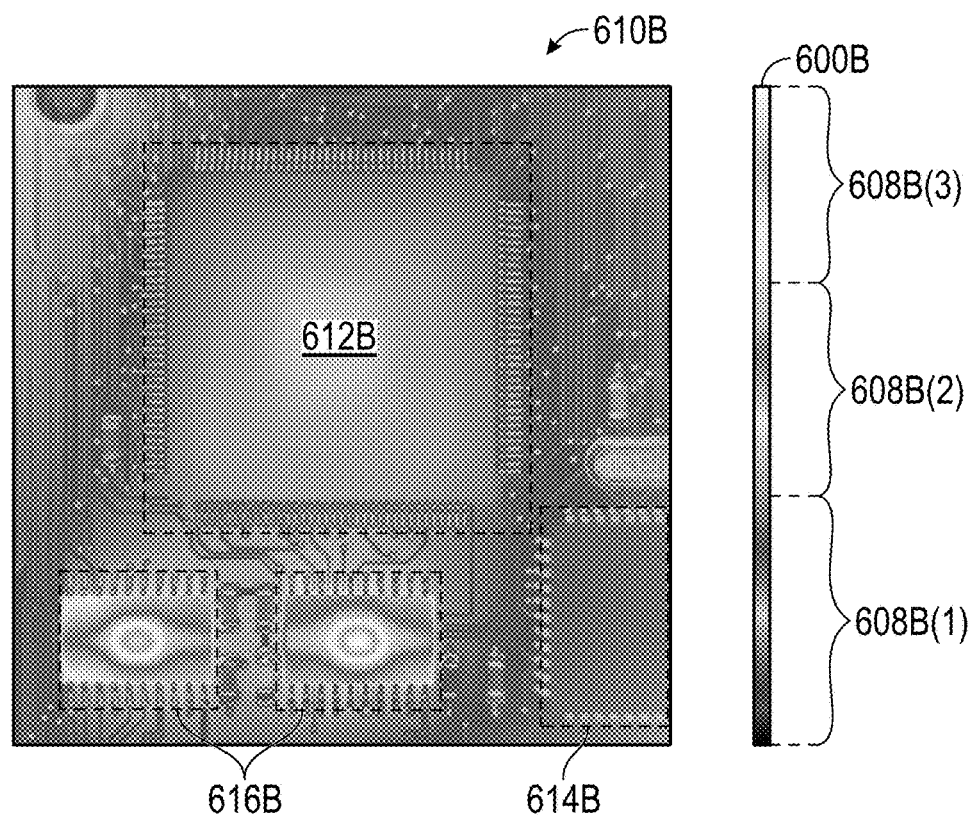

FIGS. 6A-6B show visual representations 610A and 610B generated according to palettes 600A and 600B comprising two or more subseries of base colors to improve the perceived color distance or contrast between adjacent output levels, in accordance with one or more embodiments of the present disclosure. Palettes 600A and 600B are illustrated in FIGS. 6A and 6B as color bars for ease of understanding, and may also be referred to herein as a "Double Rainbow palette" and a "Triple Rainbow palette," respectively.

In some embodiments, series of base color values 606A (individually identified as base color values 606A(1) through 606A(14)) in the Double Rainbow palette (palette 600A) may comprise two subseries of base color values, the first subseries 608A(1) comprising base color values 606A(1) through 606A(7) and the second subseries 608A(2) comprising base color values 606A(8) through 606A(14). As shown, the second subseries 608A(2) may repeat the base color values of the first subseries 608A(2) at a different saturation and/or intensity (brightness or lightness) than the base color values of the first subseries 608A(2). In this regard, both the first and second subseries 608A(1) and 608A(2) comprise base color values representing a same set of predetermined hues, but each with a different saturation and/or intensity (brightness or lightness). For example, in the Double Rainbow palette (palette 600A), the set of predetermined hues may comprise the hues of a rainbow (e.g., red, orange, yellow, green, blue, indigo, and violet), and the first subseries 608A(1) may comprise base color values 606A(1)-606A(7) that represent the hues of a rainbow with a certain saturation and/or intensity (e.g., fully saturated or in a pure hue) and the second subseries 608A(2) may comprise base color values 606A(8)-606A(14) that represent the hues of a rainbow in a different saturation and/or intensity (e.g., in a diminished saturation). Color values between successive base color values 606 are interpolated as discussed above with reference to FIG. 4.

Similarly, in some embodiments, series of base color values 606B (individually identified as base color values 606B(1) through 606B(21)) in the Triple Rainbow palette (palette 600B) may comprise three subseries of base color values 608B(1), 608B(2), and 608B(3), where the first subseries 608B(1) may comprise base color values 606B(1)-606B(7) that represent the hues of a rainbow in a certain saturation and/or intensity, the second subseries 608A(2) may comprise base color values 606B(8)-606B(14) that represent the hues of a rainbow in a different saturation and/or intensity than the first subseries 608B(1), and the third subseries 608A(3) may comprise base color values 606B(15)-606B(21) that represent the hues of a rainbow in a saturation and/or intensity different from the first and the second subseries 608B(1) and 608B(2).

Although palettes 600A and 600B having two or three subseries of base color values are illustrated as examples, palettes in other embodiments may comprise four or more subseries of base color values to further increase the perceived color distance/contrast between adjacent output levels. In addition, although subseries 608A and 608B of base color values use the hues of a rainbow as an example, other hue combinations may be utilized as understood by one skilled in the art.

The use of varying saturations and/or intensities of the base colors in such ways allows a viewer to better distinguish small color values variations, and thus, temperature changes. For example, FIG. 6A shows portions 614A and 614B corresponding to an IC in visual representation 610A and 610B of a circuit board that is clearly distinguishable from the rest of the circuit board when palettes 600A and 600B are applied, whereas, corresponding portions 214A-214C in visual representations 210A-210C generated using conventional palettes 200A-200C are indistinguishable from the surrounding circuit board areas. Portions 612A and 612B show substantial contrast relative to corresponding portions 212A-212C with traditional palettes 200A-200C applied. Portions 612A and 612B display three hues and the corresponding interpolated colors. Portions 616A and 616B also display a relatively large array of temperature differentials (e.g., up to 7 distinct hues are shown over portions 616A and up to 10 distinct hues are shown over portions 616B) in comparison to corresponding portions 216A-216C of conventional palette images 210A-210C.

Figure 7A:
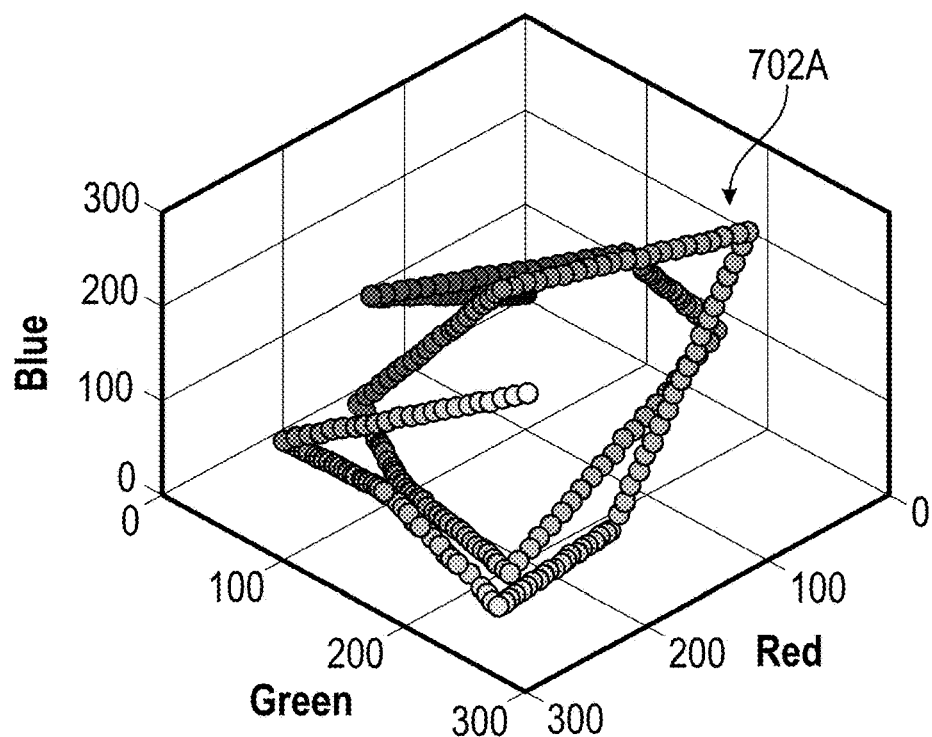
FIGS. 7A-7B illustrate example plots of the color values in the palettes used to generate the visual representation examples of FIGS. 6A-6B, in accordance with embodiments of the present disclosure.
Figure 7B:
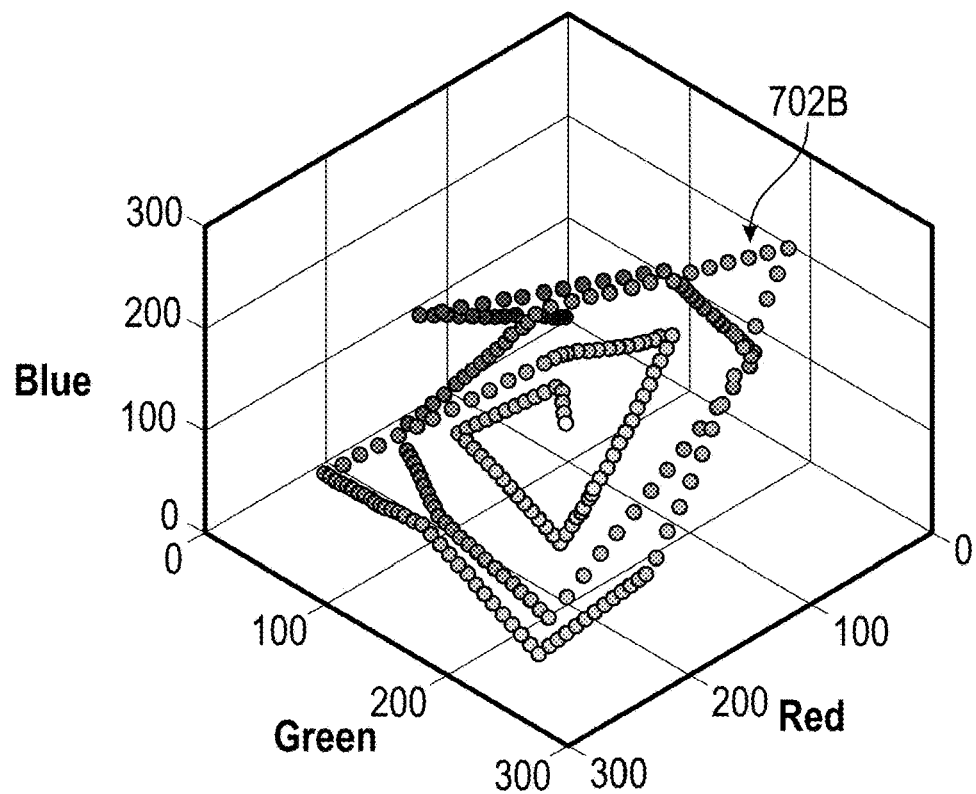

As illustrated in FIGS. 7A and 7B, the RGB-space trajectory plots 702A and 702B of palettes 600A and 600B respectively cover a greater portion of the RGB space than the trajectory plots 302A-302C of conventional single rainbow, grayscale, or ironbow palettes. Furthermore, the sequences of color values in palettes 600A and 600B show substantial distances between adjacent output levels. However, distances between adjacent output levels may still be limited due to the base colors being based on an arbitrary or familiar set of hues (e.g., a rainbow) and not how the human vision perceives color contrasts.

Figure 8A:
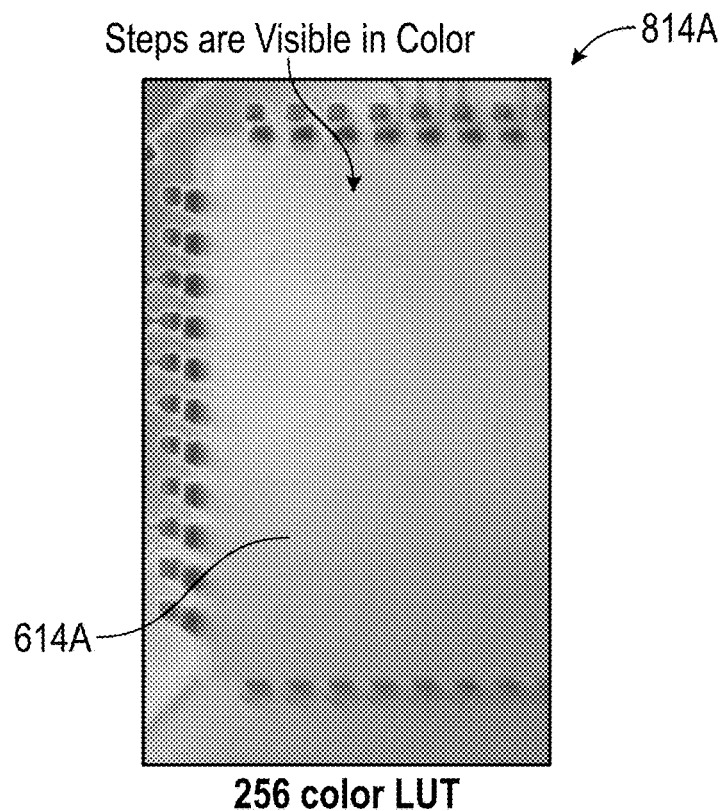
FIGS. 8A-8B illustrate close-up views of a portion of the example visual representation of FIG. 6A, in accordance with embodiments of the present disclosure.

FIG. 8A shows a close-up view 814A of portion 614A in visual representation 610A, where palette 600A comprises a sequence of 256 color values corresponding to a range of 256 distinct output levels (e.g., from output level 1 through 256), which is a typical size of a palette in IR imaging systems. As can be seen in FIG. 8A, steps (or banding) in color transitions are noticeable, especially since palette 600A advantageously increases the perceived color distances between different temperatures or IR intensities. Such steps or banding effects in visual representations may be perceived as unnatural by some users. Thus, in some embodiments, the number of distinct output levels mapped by palettes 600A and/or 600B, and hence the number of color values in palettes 600A and/or 600B, may be increase to further enhance visual representation 610A and/or 610B of IR image data.

Figure 8B:
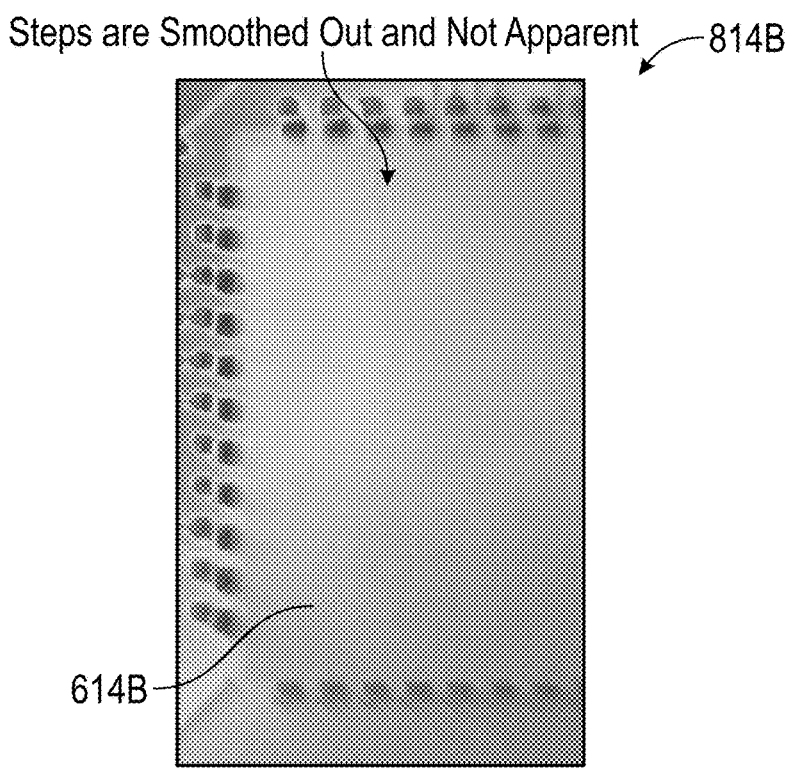

For example, FIG. 8B shows a close-up view 814B of portion 614A in visual representation 610A, where palette 600A comprises a sequence of 512 color values corresponding to a range of 512 distinct output levels (e.g., from output level 1 through 512). As can be seen from FIG. 8B, the color transitions are much smoother without noticeable steps or banding effects in embodiments with palette 600A having 512 distinct output levels. Other embodiments are contemplated in which the palette comprises a sequence of 1024 or more color values corresponding to a range of 1024 or more distinct output levels. Palettes having a larger sequence of color values may especially be beneficial to reduce stairstep or banding effects in visual representations generated according to various techniques of the present disclosure to increase color distances or contrasts between adjacent output levels.

According to some embodiments, base colors for a palette may be chosen based on how the human vision perceives color contrasts, rather than being based on an arbitrary or familiar set of hues (e.g., a rainbow). Thus, in some embodiments, the series of base color values in a palette comprise successive base color values representing colors that are complementary to each other to increase the perceptual color distance between base colors, and hence the perceptual color distance between the colors of adjacent output levels.

Referring again to FIG. 4, palette 400 may represent a palette of such an embodiment. In the example palette 400, successive base color values 406(1) and 406(2) represent the colors blue and yellow, respectively, which are complementary to each other in an RGB color model. Similarly, successive base color values 406(3) and 406(4) represent a pair of complementary colors magenta and green, and successive base color values 406(5) and 406(6) represent a pair of complementary colors red and cyan in an RGB color model. More specifically in this example, primary colors (blue, red, and green) in an RGB color model, and their respective complementary colors, which are secondary colors (e.g., yellow, magenta, and cyan obtained by combining two primary colors) in an RGB color model, are represented by the three pairs of successive base color values. However, other complementary color pairs as understood by one skilled in the art may be used in other embodiments.

In addition, base color values 406 represent colors at their maximum intensities in the example palette 400. That is, if base color values 406 are expressed in 3-tuples (R, G, B) as in the example palette 400, at least one element of each 3-tuple has the maximum value (e.g., the value of 255 if the intensities are expressed in an 8-bit integer) and complementary color value pairs can be determined as color value pairs whose additive combination of the 3-tuples has the maximum value for all components (e.g., (255, 255, 255)). Thus, for example, successive base color value pairs 406(1) and 406(2) respectively have a color value expressed in a 3-tuple (0, 0, 255) for blue and a 3-tuple (255, 255, 0) for yellow, whose additive combination results in the 3-tuple (255, 255, 255). Base color values that represent primary and secondary colors at their maximum intensities in an RGB color model lie at corners of an RGB color space, and thus can beneficially create larger spacing between adjacent output levels, as can be visualized in FIG. 9 below. It should be understood that in other embodiments based on color models other than an RGB color model, base color values representing primary and secondary colors at their at their maximum intensities, saturation, and/or brightness according to such color models may be used to achieve the same or similar effect. Furthermore, other complementary color pairs at less than the maximum intensities may be used in other embodiments as desired for particular applications.

The odd-even successive base color value pairs 406(1) and 406(2), 406(3) and 406(4), and 406(5) and 406(6) represent complementary color pairs as discussed above. In addition, the even-odd successive base color value pairs 406(2) and 406(3), and 406(4) and 406(5) represent pairs of colors that are near-complementary to each other in the example palette 400. In other words, the sequence of base color values 406 is ordered such that successive base color values, even when they are not representing a complementary color pair, are as far apart as possible in an RGB color space. This may be achieved, for example, by ordering the sequence of base color values 406 such that an additive combination of a non-complementary successive base color value pair results in a 3-tuple having two elements at their maximum value (e.g., (510, 255, 255), (255, 255, 0)). However, other arrangement or ordering of non-complementary successive base color value pairs may be used for other embodiments as desired.

Figure 9:
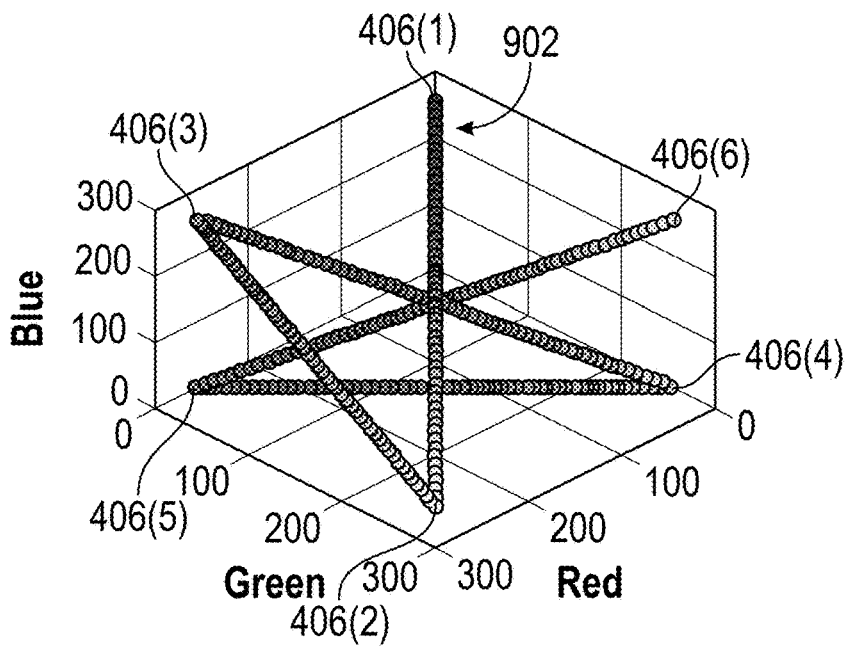
FIG. 9 illustrates an example plot of the color values in the palette of FIG. 4, in accordance with an embodiment of the disclosure.

FIG. 9 shows a trajectory plot 902 of the example palette 400 in an RGB space, in accordance with an embodiment of the disclosure. Base color values 406 are identified in plot 902, which demonstrates that successive base color values are at farthest corners (for complementary colors) or at second farthest corners (for near-complementary colors) of each other in the RGB space to create larger spacing between adjacent output levels. Moreover, RGB-space trajectory plot 902 covers a greater portion of the RGB space than trajectory plots 302A-302C of conventional single rainbow, grayscale, or ironbow palettes, and even the trajectory plots 702A and 702B of the Double and Triple Rainbow palettes.

Figure 10:
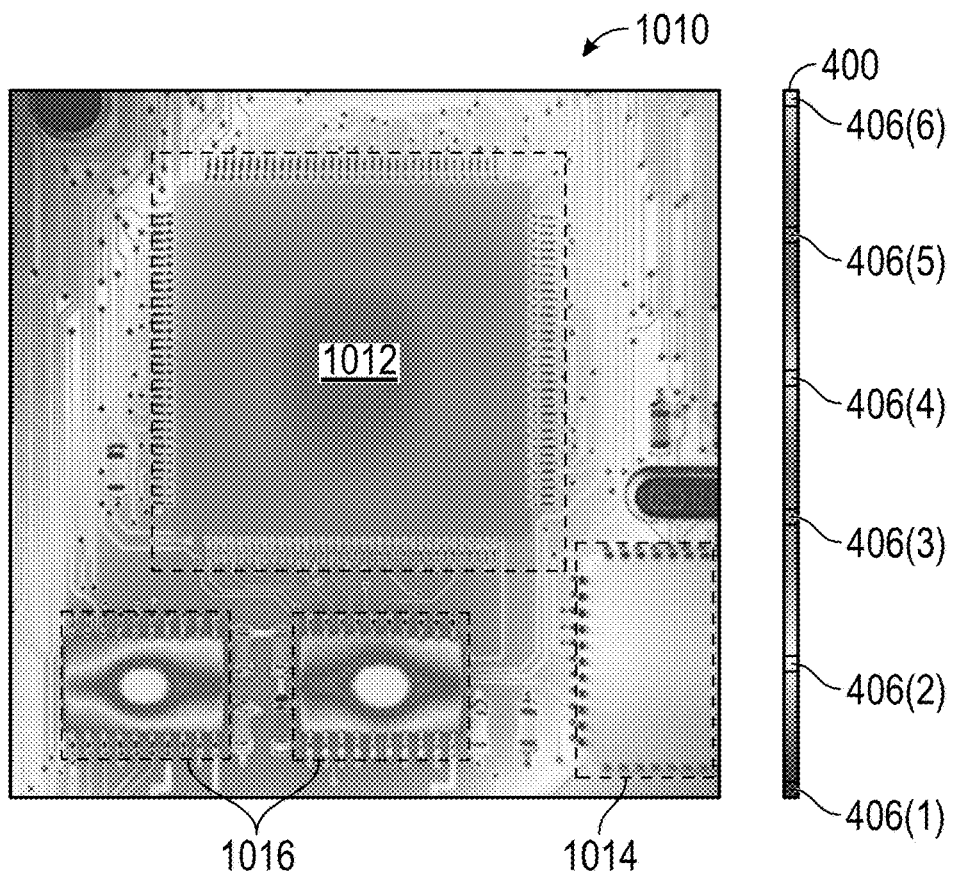
FIG. 10 illustrates an example visual representation of an infrared image generated using the palette of FIG. 4, in accordance with embodiments of the present disclosure.

An example visual representation 1010 generated according to palette 400 is shown in FIG. 10, in accordance with an embodiment of the disclosure. Palette 400 is illustrated as a color bar in FIG. 10 for ease of understanding. As can be seen from FIG. 10, portions 1012, 1014, and 1016 (e.g., representing various ICs in a circuit board) are much more distinguishable and the temperature differentials created by circuit traces on the circuit board are much more discernible in visual representation 1010, as compared with visual representations 210A-210C generated using conventional palettes 200A-200C.

Figure 11:
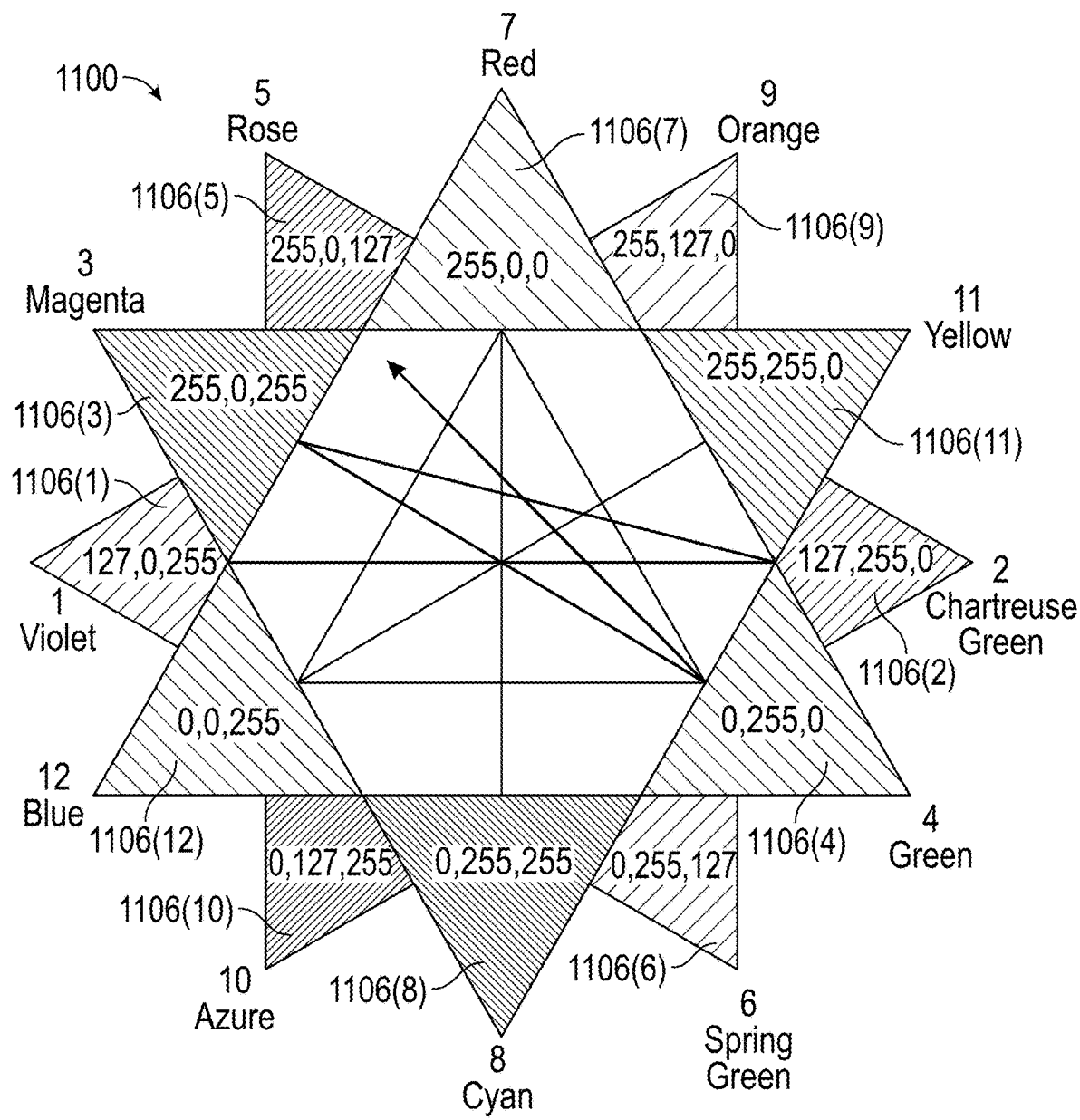
FIG. 11 illustrates a palette as a color wheel, in accordance with an embodiment of the present disclosure.

Another embodiment in which the series of base color values in a palette comprises successive base color values representing colors that are complementary to each other is illustrated with reference to FIG. 11. FIG. 11 illustrates base color values 1106 (individually identified as 1106(1) through 1106(12)) of a palette 1100 arranged as a color wheel for a more intuitive understanding, in accordance with an embodiment of the disclosure. Arranged as a color wheel, complementary colors are placed opposite to each other, with their base color values in 8-bit RGB 3-tuples and the base color value sequence also shown.

As shown, the embodiment illustrated by FIG. 11 utilizes more complementary color pairs than the example palette 400. In particular, six pairs of complementary colors are represented by base color values 1106, including three primary-secondary color complementary pairs as in the example palette 400, as well as three tertiary-tertiary color (i.e., a color obtained by a combination of a primary and a secondary color in equal portions) complementary pairs. As with the example palette 400, the color represented by base color values 1106 are at their maximum intensities in an RGB color model. That is, base color values 1106 have at least one element of each 3-tuple at the maximum value (e.g., the value of 255 if the intensities are expressed in an 8-bit integer), and thus lie at corners or on edges of an RGB color space to create larger spacing between adjacent output levels. Also, non-complementary successive base color value pairs (e.g., successive base color value 1106(2) and 1106(3), and other even-odd successive base color value pairs) represent colors that are near-complementary to each other, similar to the example palette 400. Note that the tertiary colors at their maximum intensity according to the example above may have the value 127 or 128 (depending on how fractions are rounded) as one element of the 8-bit RGB 3-tuple base color value, and thus an additive combination of a tertiary-tertiary color complementary base color value pair may result in one element of the 8-bit RGB 3-tuple having a value close to, but not exactly, the maximum value of 255 due to rounding errors.

Figure 12:
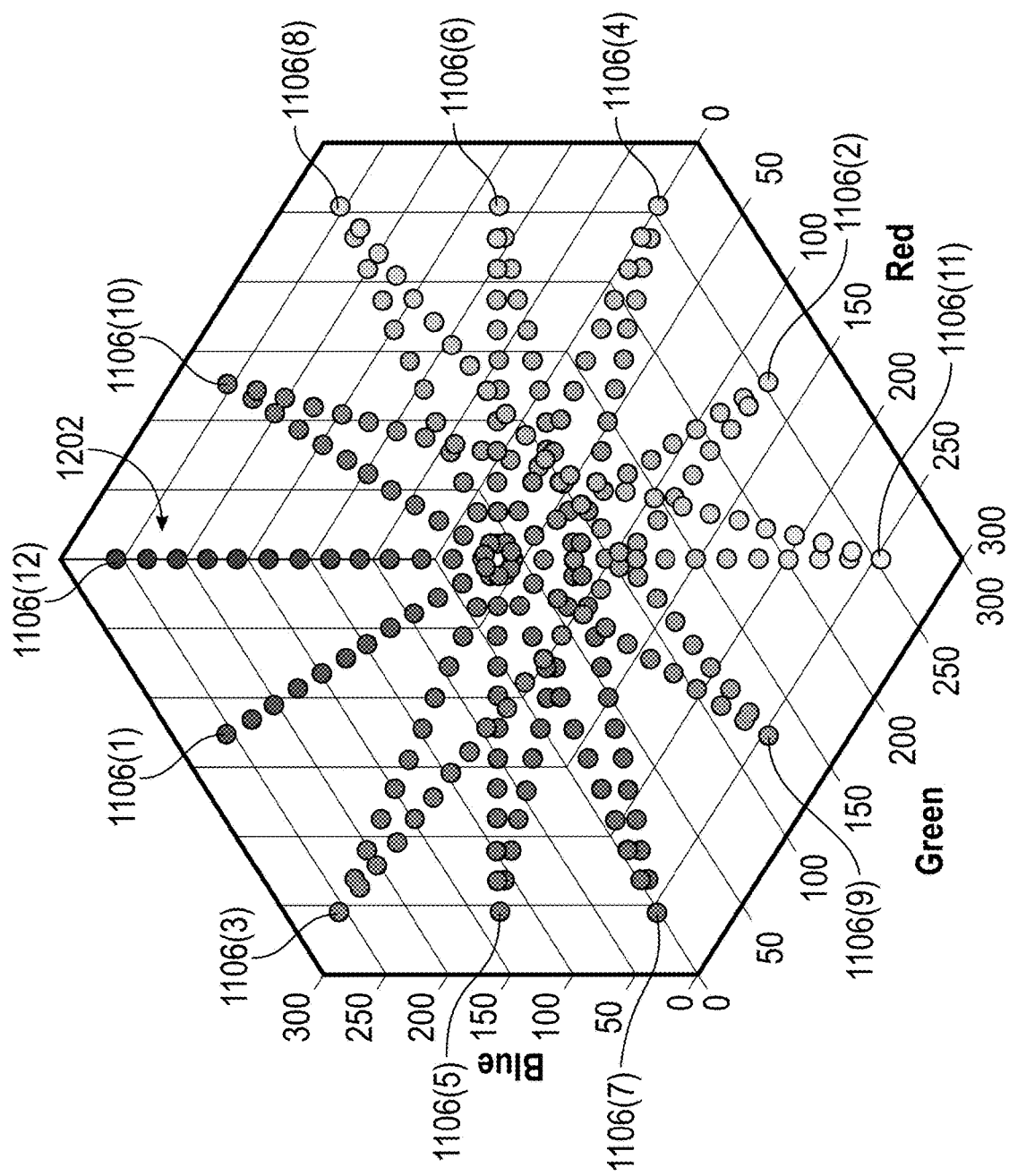
FIG. 12 illustrates an example plot of the color values in the palette of FIG. 11, in accordance with an embodiment of the disclosure.

FIG. 12 shows a trajectory plot 1202 in an RGB space of the example palette 1100 illustrated by FIG. 11, in accordance with an embodiment of the disclosure. Base color values 1106 are identified in plot 1202, which demonstrates the even larger spacing created by using twelve successive base color values that are complementary or near-complementary to each other when compared with trajectory plot 902 of the example palette 400 having six successive base color values 406 that are complementary or near complementary to each other. Moreover, RGB-space trajectory plot 1202 covers an even greater portion of the RGB space than trajectory plots 902 of palette 400 having six successive base color values 406.

Figure 13:
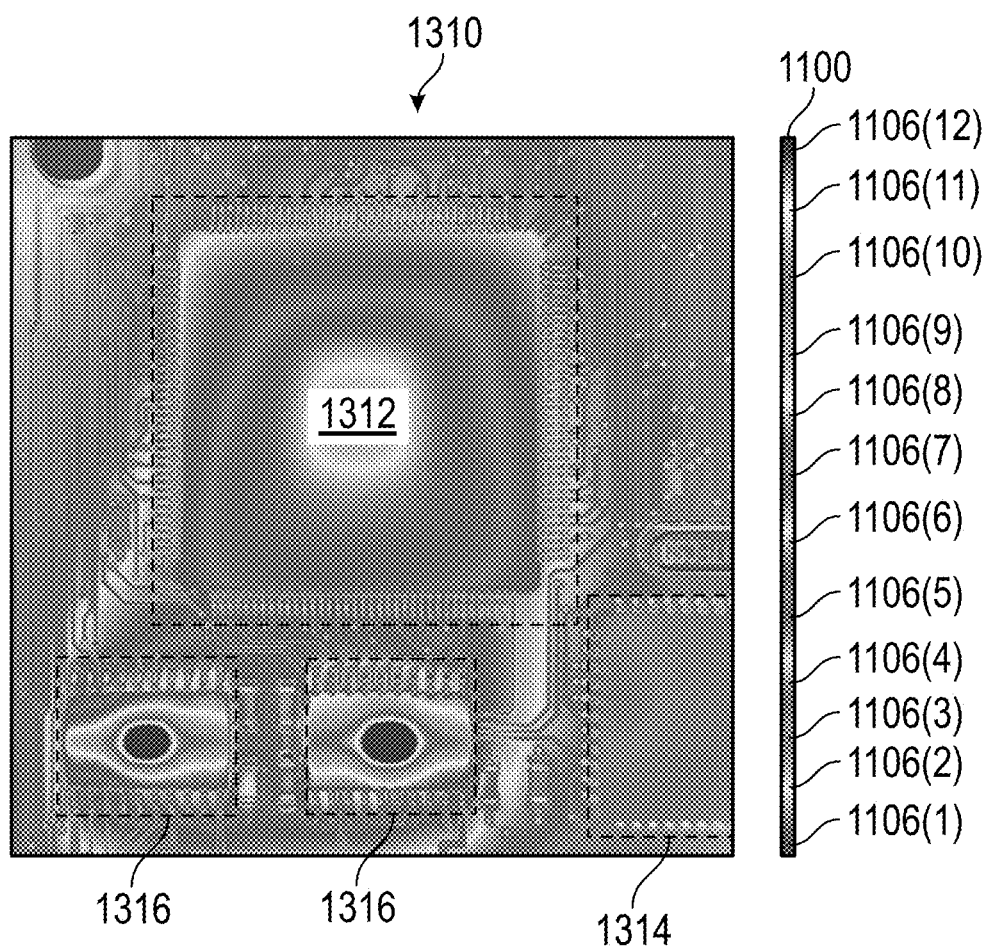
FIG. 13 illustrates an example visual representation of an infrared image generated using the palette of FIG. 11, in accordance with embodiments of the present disclosure.

An example visual representation 1310 generated by applying palette 1100 illustrated by FIG. 11 is shown in FIG. 13, in accordance with an embodiment of the disclosure. Palette 1100 is illustrated as a color bar in FIG. 13 for ease of understanding. As can be seen from FIG. 13, the temperature differentials in portions 1312, 1314, and 1316 (e.g., representing various ICs in a circuit board) and the temperature differentials created by circuit traces and other components on the circuit board are much more discernible in visual representation 1310 as compared with visual representation 1010 generated using palette 400.

The example palettes 400 and 1100 according to various embodiments of the disclosure do not repeat or reuse base color values. Thus, if IR data values 520 of a captured IR image determine output levels 522 according to a fixed mapping as discussed above in connection with FIG. 5, visual representations 1010 and 1310 generated by applying the example palettes 400 and 1100 will be radiometric images having a one-to-one correspondence between colors and temperatures (or IR intensity levels) observed from a scene.

A palette 1400 that comprises successive base color values 1406 representing pairs of colors that are complementary to each other is illustrated in FIG. 14, in accordance with yet another embodiment of the disclosure. Base color values 1406 may also be individually identified as base color values 1406(1) through 1406(26) corresponding to the base color number shown in FIG. 14. The sequence of color values in palette 1400 other than base color values 1406 are omitted in FIG. 14 for clarity. As discussed herein, such other color values in the sequence are interpolated between successive base color values.

In palette 1400, complementary color pairs are reused or repeated in the sequence of base color values 1406 to provide 26 base color values 1406(1) through 1406(26). More specifically, for example, base color values 1406(1) through 1406(12) (also identified as subseries 1409(1) in FIG. 14) represent the six pairs of complementary colors identified with respect to palette 1100 above, whereas base color values 1406(13) through 1406(24) (also identified as subseries 1409(2) in FIG. 14) also represent the six pairs of complementary colors but in different orders than subseries 1409(1). In other embodiments, the six pairs of complementary colors may be repeated in the same order in the sequence of base color values 1406. Successive base color values 1406(25) and 1406(26) repeat the complimentary color pair blue and yellow to pad the end of the sequence of color values in palette 1400. Also in this example, every pair of successive base color values 1406 in palette 1400 represent a pair of colors that are complementary or near-complementary to each other.

In other embodiments, not all six pairs of complementary colors need to be repeated, but instead one or more pairs selected from the six pairs may be repeated. For example, a palette comprising successive base color value pairs representing seven pairs (the six pairs plus one repeated from the six pairs), eight pairs (the six pairs plus two repeated pairs), nine pairs (the six pairs plus three repeated pairs), ten pairs (the six pairs plus four repeated pairs), or eleven pairs (the six pairs plus five repeated pairs) may be provide depending on embodiments. In yet other embodiments, two or more pairs from the six pairs of complementary colors may be repeated more than twice in the sequence of base color values 1406.

Figure 15:
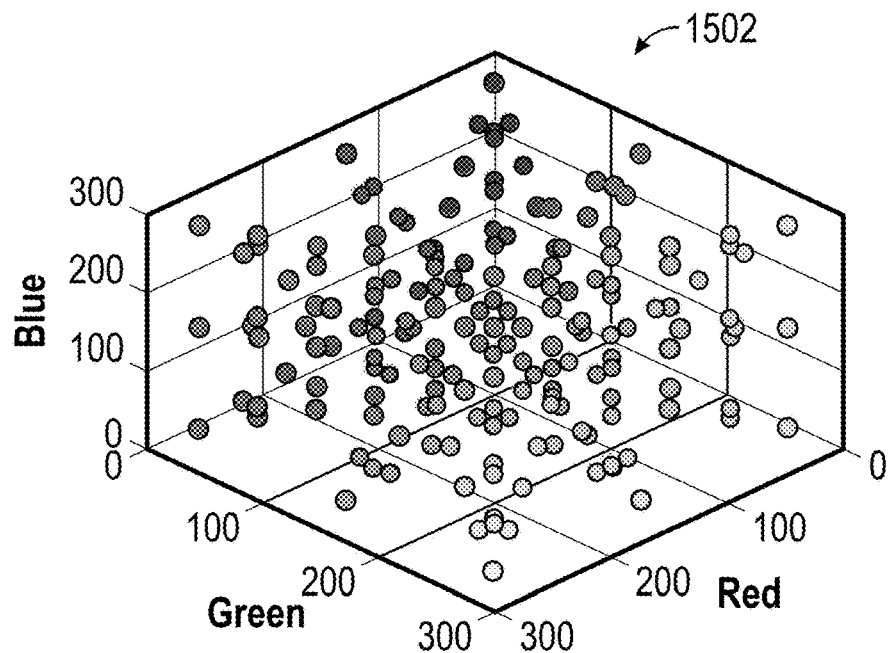
FIG. 15 illustrates an example plot of the color values in the palette of FIG. 14, in accordance with an embodiment of the disclosure.

FIG. 15 shows a trajectory plot 1502 of the example palette 1400 in an RGB space, in accordance with an embodiment of the disclosure. The spacing (or the perceptual color distance) between two adjacent output levels are even greater in plot 1502 than in trajectory plot 1202 of the example palette 1100 not having the repeated pairs. Thus, applying a high-base-color-count palette such as palette 1400 may beneficially create large local contrast in a visual representation of IR image data.

Figure 16:
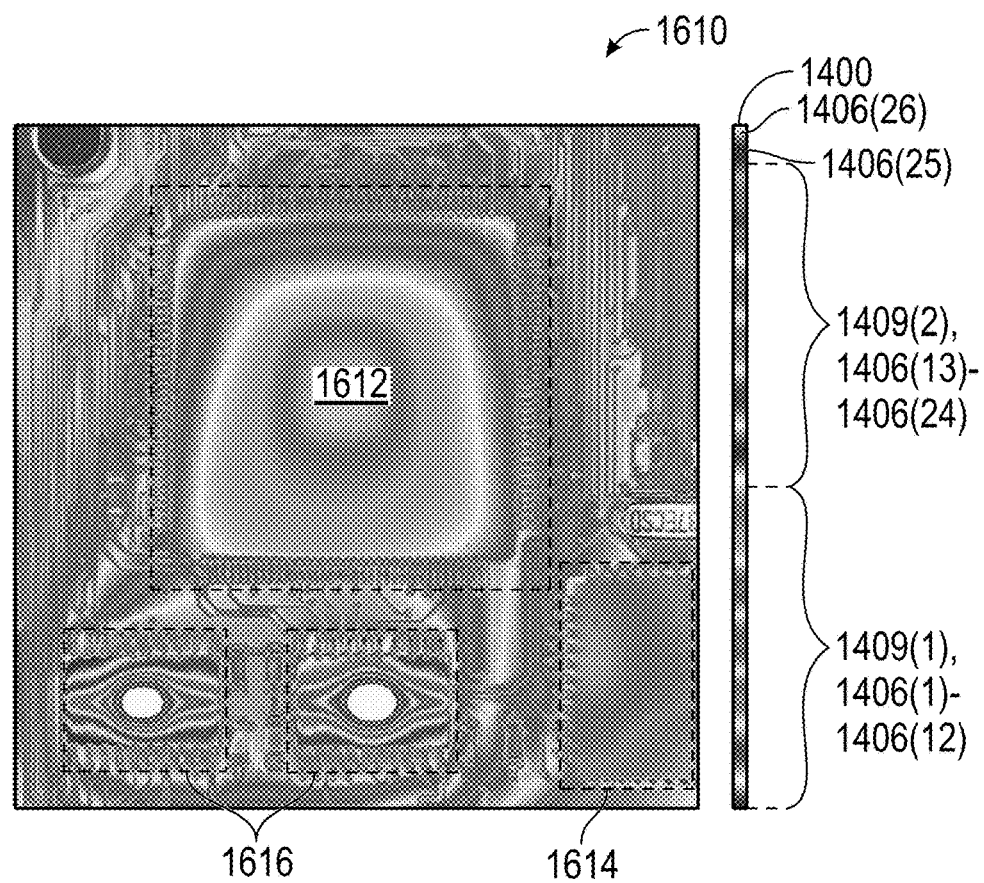
FIG. 16 illustrates an example visual representation of an infrared image generated using the palette of FIG. 14, in accordance with embodiments of the present disclosure.

Such a beneficial effect may be observed in an example visual representation 1610 generate by applying palette 1400, as shown in FIG. 16 in accordance with an embodiment of the disclosure. In visual representation 1610, local temperature differentials, for example in portions 1612, 1614, and 1616, are exaggerated by high color contrast, which is useful for discerning and interpreting small temperature differentials in localized areas in a scene. However, visual representation 1610 may not be useful for global temperature measurement, since it is not radiometric due to the repetition of base colors in palette 1400.

Figure 17:
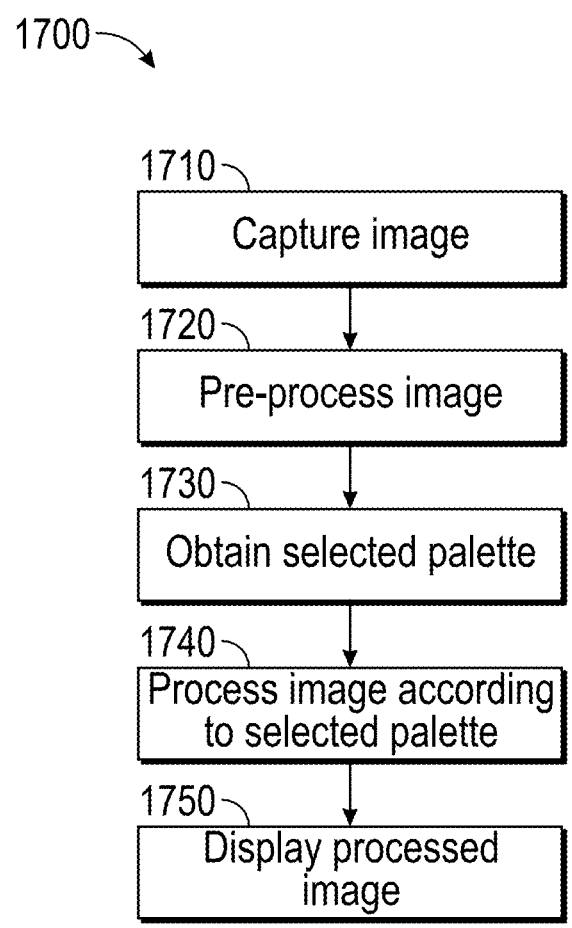
FIG. 17 illustrates a flowchart of a computer-implemented method for generating a visual representation of an IR image, in accordance with an embodiment of the present disclosure.

Turning now to FIG. 17, a flowchart is shown of a method 1700 for capturing and processing infrared images in accordance with an embodiment of the present disclosure. For purposes of simplifying discussion of FIG. 17, reference may be made to imaging system 100 of FIG. 1 as an example of a system, device, or apparatus that may perform method 1700. However, method 1700 may be performed by other suitable imaging systems, devices, or apparatuses as would be understood by one skilled in the art.

At block 1710, one or more images (e.g., IR image data or signal) may be captured using infrared imaging system 100. In one embodiment, processing component 110 induces (e.g., causes) image capture component 130 to capture an image, such as a thermal infrared image of scene 170. For example, IR image data captured by an IR imaging sensor of image capture component 130 may comprise a plurality of pixels each having an IR data value representing an intensity of IR radiation received by corresponding detector elements of the IR imaging sensor. After receiving the captured image (e.g., IR image data) from image capture component 130, processing component 110 may optionally store the captured image in memory component 120 for processing.

Next, the captured image may optionally be pre-processed at block 1720. In one embodiment, pre-processing may include obtaining infrared sensor data related to the captured image, applying correction terms, and/or applying temporal noise reduction to improve image quality prior to further processing. In one embodiment, processing component 110 may directly pre-process the captured image or optionally retrieve the captured image stored in memory component 120 and then pre-process the image. Pre-processed images may be optionally stored in memory component 120 for further processing.

At block 1730, a palette may be selected to use in determining color values that corresponds to the captured IR data values. For example, such a palette may be selected from one or more palettes that improve the perceptual color distance between adjacent output levels in accordance with various techniques discussed above, such as palettes 400, 600A, 600B, 1100, and/or 1400 (e.g., stored as palettes 112 in memory component 120). In various embodiments, the palette to be used in determining color values for the captured IR data values may be selected in response to receiving a user input via control component 150 of IR imaging system 100 for example, or automatically selected by processing component 110, or both. In this regard, according to some embodiments, a user of IR imaging system 100 may be presented with a menu one of several scenarios, applications, or modes (identified in the menu by names indicative of the scenarios, e.g., man overboard, maintenance, electrical systems surveillance or inspection, heating or ventilation, or other situations where IR imaging may be useful) on a display or control panel, so that the user may select an applicable use scenario. In such embodiments, processing component 110 may be configured to select an appropriate one of the available palettes based on the user's selection of the use scenario, and optionally further based on an analysis of the captured IR image data (e.g., based on the analysis of how much local contrast is present in the captured IR image).

At block 1740, a visual representation of at least a portion of the captured IR image data may be generated according to the various techniques discussed in detail above with reference to FIGS. 4 through 16. Thus, for example, an output level may be determined based on the IR data value for each pixel of the at least a portion of the captured IR image data, and then a color value corresponding to the determined output level may be determined according to the selected palette, where the selected palette is provided according to the various techniques of the present disclosure to improve the perceived color distance between adjacent output levels. In one embodiment, processing component 110 may store the generated visual representation in memory component 120 for displaying.

At block 1750, the generated visual representation may be displayed. For example, in one embodiment, processing component 110 may retrieve the generated visual representation stored in memory component 120 and display the visual representation on display component 140 for viewing by a user. Display component 140 and/or control component 150 may also be configured to allow for interaction (e.g., editing) with processed image via touch screen, interface, or other known methods of interaction with an electronic device.

In some embodiments, the displaying of the visual representation at block 1750 may include converting the generated visual representation in one color model into a representation in another color model used by display component 140. In some embodiments, the displaying of the visual representation at block 1750 may include marking (e.g., colorizing, highlighting, or identifying with other indicia) certain features in the visual representation, for example, to aid a user to identify these features while viewing the displayed image. In some embodiments, the displaying of the visual representation at block 1750 may include overlaying or appending a representation (e.g., a color bar with or without a corresponding temperature range) of the palette being applied to generate the visual representation. In some embodiments, the displaying of the visual representation at block 1750 may include fusing, overlaying, or otherwise combining the visual representation of an IR image with a non-thermal image (e.g., a visible light image captured by visible light imaging device 190) to enhance the visual representation of the captured IR image data with further contrast and/or detail extracted from the non-thermal image according to known techniques, such as for example those described in U.S. Pat. No. 8,520,970 issued Aug. 27, 2013 and entitled "Infrared Resolution and Contrast Enhancement with Fusion" and in U.S. Pat. No. 8,565,547 issued Oct. 22, 2013 and entitled "High Contrast Fusion," which are incorporated herein by reference by their entireties.

As discussed herein above, various embodiments of the present disclosure can provide enhanced visual representations of IR images by utilizing palettes that advantageously improve the perceived color distance or contrast between colors corresponding to adjacent output levels (e.g., similar temperature or IR intensity) in IR images. Thus, for example, users of an infrared imaging system according to various embodiments of the disclosure may be provided with enhanced visual representations of IR images that beneficially allow users to discern subtle local temperature or IR intensity differences for a better understanding and interpretation of the scene or object that the users are inspecting or otherwise monitoring.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the invention. Where applicable, various hardware components and/or software components set forth herein may be separated into subcomponents having software, hardware, and/or both without departing from the scope and functionality of the invention. Where applicable, it is contemplated that software components may be implemented as hardware components and vice-versa.

Software, in accordance with the invention, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
    receiving infrared (IR) image data captured by an IR imaging sensor comprising a plurality of detector elements, wherein the IR image data comprises, for each detector element, a corresponding pixel having an IR data value representing an intensity of IR radiation received by the detector element; and generating a visual representation of at least a portion of the IR image data, wherein the visual representation comprises, for each pixel of the at least the portion of the IR image data, a corresponding color-representing component according to a color model, and wherein the generating the visual representation comprises, for each pixel:

determining an output level based on the IR data value of the pixel, determining a color value that corresponds to the determined output level according to a palette, and assigning the determined color value to the corresponding color-representing component of the visual representation;

wherein the palette comprises a sequence of color values corresponding to a range of discrete output levels, the sequence of color values comprising a series of base color values positioned at substantially similar intervals partitioning the sequence, wherein color values in the sequence other than the base color values are interpolated between successive base color values; and wherein the series of base color values comprises:

at least one pair of successive base color values representing a pair of colors that are complementary to each other, or two or more subseries each representing a different saturation and/or intensity of a same set of predetermined hues.

2. The method of claim 1, wherein the series of base color values comprises at least three pairs of successive base color values, each pair representing a pair of colors that are complementary to each other; and wherein colors represented by the at least three pairs of successive base color values comprise primary and secondary colors at their maximum intensities, saturation, and/or brightness according to the color model.

3. The method of claim 1, wherein the series of base color values comprises at least six pairs of successive base color values, each pair representing a pair of colors that are complementary to each other; and wherein colors represented by the at least six pairs of successive base color values comprise primary, secondary, and tertiary colors at their maximum intensities, saturation, and/or brightness according to the color model; or wherein the series of base color values further comprises at least one pair of successive base color values that are repeated from the at least six pairs of successive base color values representing complementary colors; or wherein the series of base color values comprises two or more subseries that each comprise, in different or same orders, the at least six pairs of successive base color values representing complementary colors.

4. The method of claim 1, wherein the sequence of base color values comprises a subsequence in which every odd-even successive base color value pair represents a pair of colors that are complementary to each other and every even-odd successive base color value pair represents a pair of colors that are near-complementary to each other.

5. The method of claim 1, wherein:

the range of discrete output levels comprises at least 1024 output levels represented in 10-bit integers; and the sequence of color values comprises at least 1024 color values corresponding to the 1024 output levels.

6. The method of claim 1, wherein:

the series of base color values comprises the two or more subseries, a first subseries of the two or more subseries comprises base color values representing hues of red, orange, yellow, green, blue, indigo, and violet;

a second subseries of the two or more subseries comprises base color values representing the hues of red, orange, yellow, green, blue, indigo, and violet having a different saturation and/or intensity than the first subseries; and a third subseries of the two or more subseries comprises base color values representing the hues of red, orange, yellow, green, blue, indigo, and violet having a different saturation and/or intensity than the first and the second subseries.

7. The method of claim 1, wherein the output level for each pixel is determined based on the IR data value of the pixel relative to the span of all IR data values captured in the at least the portion of the IR image data; or wherein the output level for each pixel is determined by a fixed mapping between the IR data value and the output level of the pixel.

8. The method of claim 1, wherein:

the color model is an RGB color model or a hue-saturation-value (HSV) model;

the color-representing components of the visual representation each comprise a 3-tuple representing intensities in three primary colors or a 3-tuple representing hue, saturation, and brightness;

each of the base color values has at least one of the three primary colors at a maximum intensity;

the range of discrete output levels comprises at least 512 output levels represented in 9-bit integers; and the sequence of color values comprises at least 512 color values corresponding to the 512 output levels.

9. The method of claim 1, further comprising:

receiving a control signal indicative of a type of use of the visual representation; and selecting the palette from a set of palettes in response to the control signal.

10. The method of claim 1, wherein the two or more subseries comprise two or more disjoint subseries, and wherein each of the two or more disjoint subseries is associated with a respective plurality of the base color values.

11. The method of claim 1, wherein each discrete output level corresponds to a respective IR intensity level or temperature level, and wherein the series of base color values partitions the sequence such that, for each base color value, the base color value is associated with one of the discrete output levels and its adjacent base color value is associated with an other of the discrete output levels, and wherein each color value in the sequence between the base color value and its adjacent base color value is associated with a discrete output level between the one of the discrete output levels and the other of the discrete output levels.

12. The method of claim 1, wherein each of the base color values is associated with a 3-tuple comprising a first component, a second component, and a third component, and wherein at least two of the base color values have the same value for the first component, the same value for the second component, and the same value for the third component.

13. An imaging system comprising:

an infrared (IR) imaging sensor comprising a plurality of detector elements, the IR imaging sensor being configured to capture IR image data comprising, for each detector element, a corresponding pixel having an IR data value that represents an intensity of IR radiation received by the detector element;

a memory configured to store a palette comprising a sequence of color values corresponding to a range of discrete output levels;

a processor communicatively coupled to the IR imaging sensor and the memory, the processor being configured to generate a visual representation of at least a portion of the IR image data;

wherein the visual representation comprises, for each pixel of the at least the portion of the IR image data, a corresponding color-representing component according to a color model;

wherein the processor is configured to generate the visual representation at least by:

determining, for each pixel of the at least the portion of the IR image data, an output level based on the IR data value of the pixel, determining a color value that corresponds to the determined output level according to the palette, and assigning the determined color value to the corresponding color-representing component of the visual representation;

wherein the sequence of color values comprises a series of base color values positioned at substantially similar intervals partitioning the sequence;

wherein color values in the sequence other than the base color values are interpolated between successive base color values; and wherein the series of base color values comprises:

at least one pair of successive base color values representing a pair of colors that are complementary to each other, or two or more subseries each representing a different saturation and/or intensity of a same set of predetermined hues.

14. The system of claim 13, wherein the series of base color values comprises at least three pairs of successive base color values, each pair representing a pair of colors that are complementary to each other; and wherein colors represented by the at least three pairs of successive base color values comprise primary and secondary colors at their maximum intensities, saturation, and/or brightness according to the color model.

15. The system of claim 13, wherein the series of base color values comprises at least six pairs of successive base color values, each pair representing a pair of colors that are complementary to each other; and wherein colors represented by the at least six pairs of successive base color values comprise primary, secondary, and tertiary colors at their maximum intensities, saturation, and/or brightness according to the color model; or wherein the series of base color values further comprises at least one pair of successive base color values that are repeated from the at least six pairs of successive base color values representing complementary colors; or wherein the series of base color values comprises two or more subseries that each comprise, in different or same orders, the at least six pairs of successive base color values representing complementary colors.

16. The system of claim 13, wherein the sequence of color values comprises a subsequence in which every odd-even successive base color value pair represents a pair of colors that are complementary to each other and every even-odd successive base color value pair represents a pair of colors that are near-complementary to each other.

17. The system of claim 13, wherein:

the series of base color values comprises the two or more subseries, a first subseries of the two or more subseries comprises base color values representing hues of red, orange, yellow, green, blue, indigo, and violet;

a second subseries of the two or more subseries comprises base color values representing the hues of red, orange, yellow, green, blue, indigo, and violet having a different saturation and/or intensity than the first subseries; and a third subseries of the two or more subseries comprises base color values representing the hues of red, orange, yellow, green, blue, indigo, and violet having a different, saturation and/or intensity than the first and the second subseries.

18. The system of claim 13, wherein the output level for each pixel is determined based on the IR data value of the pixel relative to the span of all IR data values captured in the at least the portion of the IR image data; or wherein the output level for each pixel is determined by a fixed mapping between the IR data value and the output level of the pixel.

19. The system of claim 13, wherein:

the color model is an RGB color model or a hue-saturation-value (HSV) model; and the color-representing components of the visual representation each comprise a 3-tuple representing intensities in three primary colors or a 3-tuple representing hue, saturation, and brightness.

20. The system of claim 13, further comprising a display device, wherein the processor is further configured to convert the color-representing components into representations in another color model used by the display device.

* * * * *